(12) United States Patent
Shigeta et al.

(10) Patent No.: US 12,457,394 B2
(45) Date of Patent: Oct. 28, 2025

(54) IMAGE PICKUP APPARATUS WITH AIR COOLING MECHANISM

(71) Applicant: CANON KABUSHIKI KAISHA, Tokyo (JP)

(72) Inventors: Koichi Shigeta, Kanagawa (JP); Yuko Iritani, Tokyo (JP); Yuko Teruya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 18/310,077

(22) Filed: May 1, 2023

(65) Prior Publication Data
US 2023/0370704 A1 Nov. 16, 2023

(30) Foreign Application Priority Data

May 10, 2022 (JP) ................................ 2022-077640

(51) Int. Cl.
*H04N 23/52* (2023.01)
*G02B 27/64* (2006.01)
(Continued)

(52) U.S. Cl.
CPC ............ *H04N 23/52* (2023.01); *G03B 17/55* (2013.01); *H04N 23/00* (2023.01); *H04N 23/51* (2023.01);
(Continued)

(58) Field of Classification Search
CPC ........ H04N 23/50; H04N 23/51; H04N 23/52; H04N 23/54; H04N 23/57; H04N 23/68;
(Continued)

(56) References Cited

U.S. PATENT DOCUMENTS

2009/0002549 A1* 1/2009 Kobayashi ............. H04N 23/52
 348/374
2012/0050608 A1* 3/2012 Makara .................. H04N 23/54
 348/373
(Continued)

FOREIGN PATENT DOCUMENTS

JP 2019-186871 A 10/2019

OTHER PUBLICATIONS

Professional Camcorder—Published Mar. 21, 2021, 21 Pgs (Sony Corporation, Internet URL: https://www.sony.jp/pro-cam/products/ILME-FX3/).

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

A small-sized image pickup apparatus which has space for locating a portion capable of applying image stabilization to an image pickup unit and is capable of capturing high-quality images by rapidly cooling an image sensor in the image pickup unit. The image pickup apparatus includes a housing, an image pickup unit disposed to divide an inner space of the housing into a first space and a second space, an electronic component, a first duct, and a second duct, where the second space is in front of the first space. The electronic component is in the first space. The first duct is in the first space, and includes a first heat exchanger that exchanges heat with the electronic component and a first flow path. The second duct is in the second space, and includes a second heat exchanger that exchanges heat with the image pickup unit, and a second flow path.

16 Claims, 18 Drawing Sheets

(51) Int. Cl.
*G03B 17/55* (2021.01)
*H04N 23/00* (2023.01)
*H04N 23/51* (2023.01)
*H04N 23/54* (2023.01)
*H04N 23/57* (2023.01)
*H04N 23/60* (2023.01)
*H04N 23/68* (2023.01)
*H05K 7/20* (2006.01)

(52) U.S. Cl.
CPC ............ *H04N 23/54* (2023.01); *H04N 23/57* (2023.01); *H04N 23/665* (2023.01); *H04N 23/687* (2023.01); *H05K 7/20145* (2013.01); *G02B 27/646* (2013.01); *G03B 2205/0038* (2013.01); *G03B 2205/0053* (2013.01)

(58) Field of Classification Search
CPC .. H04N 23/685; H04N 23/687; H04N 23/665; H05K 7/2039; H05K 7/20136–20209; G03B 17/55; G03B 17/02; G03B 30/00; G03B 2217/00; G03B 2217/002; G03B 2205/0038; G03B 2205/0053; G03B 2205/0061; G03B 2205/0069; G03B 2205/0076; G03B 2205/0084; G02B 27/64; G02B 27/646
See application file for complete search history.

(56) References Cited

U.S. PATENT DOCUMENTS

| | | | |
|---|---|---|---|
| 2016/0301819 A1* | 10/2016 | Petty | G03B 17/55 |
| 2017/0131621 A1* | 5/2017 | Tang | G03B 17/561 |
| 2020/0344922 A1* | 10/2020 | Wada | H05K 7/20172 |
| 2022/0263991 A1* | 8/2022 | Yamamoto | H04N 23/58 |
| 2022/0286593 A1* | 9/2022 | Amano | H04N 23/54 |
| 2023/0035644 A1* | 2/2023 | Kuroki | H05K 7/2039 |

* cited by examiner

IMAGE PICKUP APPARATUS WITH AIR COOLING MECHANISM

FIELD OF THE INVENTION

The present invention relates to image pickup apparatuses.

DESCRIPTION OF THE RELATED ART

In recent image pickup apparatuses, the image quality of recorded images such as the resolution and the frame rate thereof, has been improved. The signal processing load and power consumption of such image pickup apparatuses tend to increase at the time of image recording, resulting in significant heat generation in electronic components, such as an image pickup unit and a data recording unit, of the image pickup apparatuses. Since the performance of such electronic components of the image pickup apparatuses may deteriorate at high temperatures, image pickup apparatuses, in which such electronic components are cooled, are awaited.

Known image pickup apparatuses are equipped with image stabilization function that detects vibrations transmitted from the outside and cancels the vibrations on the basis of the detection result. The image stabilization function enables the image pickup apparatuses to record high-quality images. An image pickup apparatus disclosed in "Professional Camcorder" (Sony Corporation, Internet URL: https://www.sony.jp/pro-cam/products/ILME-FX3/) is equipped with both cooling function for the whole apparatus and image stabilization function.

Such an image pickup apparatus disclosed in the "Professional Camcorder" tends to be enlarged because of room for both the cooling function for the whole apparatus and the image stabilization.

Furthermore, an image pickup apparatus disclosed in Japanese Laid-Open Patent Publication (kokai) No. 2019-186871, configured to forcibly air-cool the whole apparatus and an image pickup unit is known. This image pickup apparatus is not equipped with image stabilization function, and still has room for improvement in size because a cooling fan is installed in the image pickup apparatus and it tends to enlarge the image pickup apparatus.

SUMMARY OF THE INVENTION

The present invention provides an image pickup apparatus which has space for locating a portion capable of applying image stabilization to an image pickup unit and is capable of capturing high-quality images by rapidly cooling an image sensor, while being small in size.

According to an aspect of the invention, an image pickup apparatus includes a housing in a front part of which a lens barrel containing a lens is disposed, and an image pickup unit including an image sensor that picks up an optical image formed by the lens. The image pickup unit is disposed in an inner space of the housing to divide the inner space into a first space and a second space, where the second space is in front of the first space. The image pickup apparatus further includes an electronic component in the first space, a first duct in the first space, and a second duct in the second space. The electronic component is communicably connected to the image sensor. The first duct includes a first heat exchanger that exchanges heat with the electronic component, and a first flow path through which air for cooling the electronic component via the first heat exchanger passes. The second duct includes a second heat exchanger that exchanges heat with the image pickup unit, and a second flow path through which air for cooling the image pickup unit via the second heat exchanger passes.

According to an aspect of the invention, an image pickup apparatus includes a housing in a front part of which a lens barrel containing a lens is disposed, and an image pickup unit including an image sensor that picks up an optical image formed by the lens. The image pickup unit is disposed in an inner space of the housing to divide the inner space into a first space and a second space, where the second space is in front of the first space. The image pickup apparatus further includes a duct in the second space. The duct includes a heat exchanger that exchanges heat with the image pickup unit, and a flow path through which air for cooling the image pickup unit via the heat exchanger passes. The image sensor has a rectangular shape as viewed from an optical axis direction of the image sensor, and the duct includes portions extending along two adjacent sides of the rectangular shape.

According to the present invention, a portion capable of applying image stabilization to the image pickup unit can be located in the image pickup apparatus while the image pickup apparatus is downsized. Furthermore, rapid cooling of the image sensor enables the downsized image pickup apparatus to capture high-quality images.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. However, the configurations described in the following embodiments are merely examples, and the scope of the present invention is not limited by the configurations described in the embodiments. For example, components constituting the present invention can be replaced with respective units having any configuration capable of exhibiting similar functions, and any additional component may be added to the components. Any two or more configurations (features) of the embodiments may be combined.

First Embodiment

Hereinafter, a first embodiment will be described with reference to FIGS. 1 to 11B. It should be noted that, for convenience of the following description, an XYZ coordinate system is defined as follows. The Z-axis direction is an imaging optical axis direction of an image pickup apparatus 1, in which the direction in which an imaging subject is located is defined as positive. On a plane orthogonal to the Z-axis direction, the width direction of the image pickup apparatus 1 is defined as the X-axis direction, in which the right, as viewed from the subject toward the image pickup apparatus 1, is defined as positive. On a plane orthogonal to the Z-axis direction, the vertical direction of the image pickup apparatus 1 is defined as the Y-axis direction, in which the direction toward the top of the image pickup apparatus 1 is defined as positive.

Figure 1:
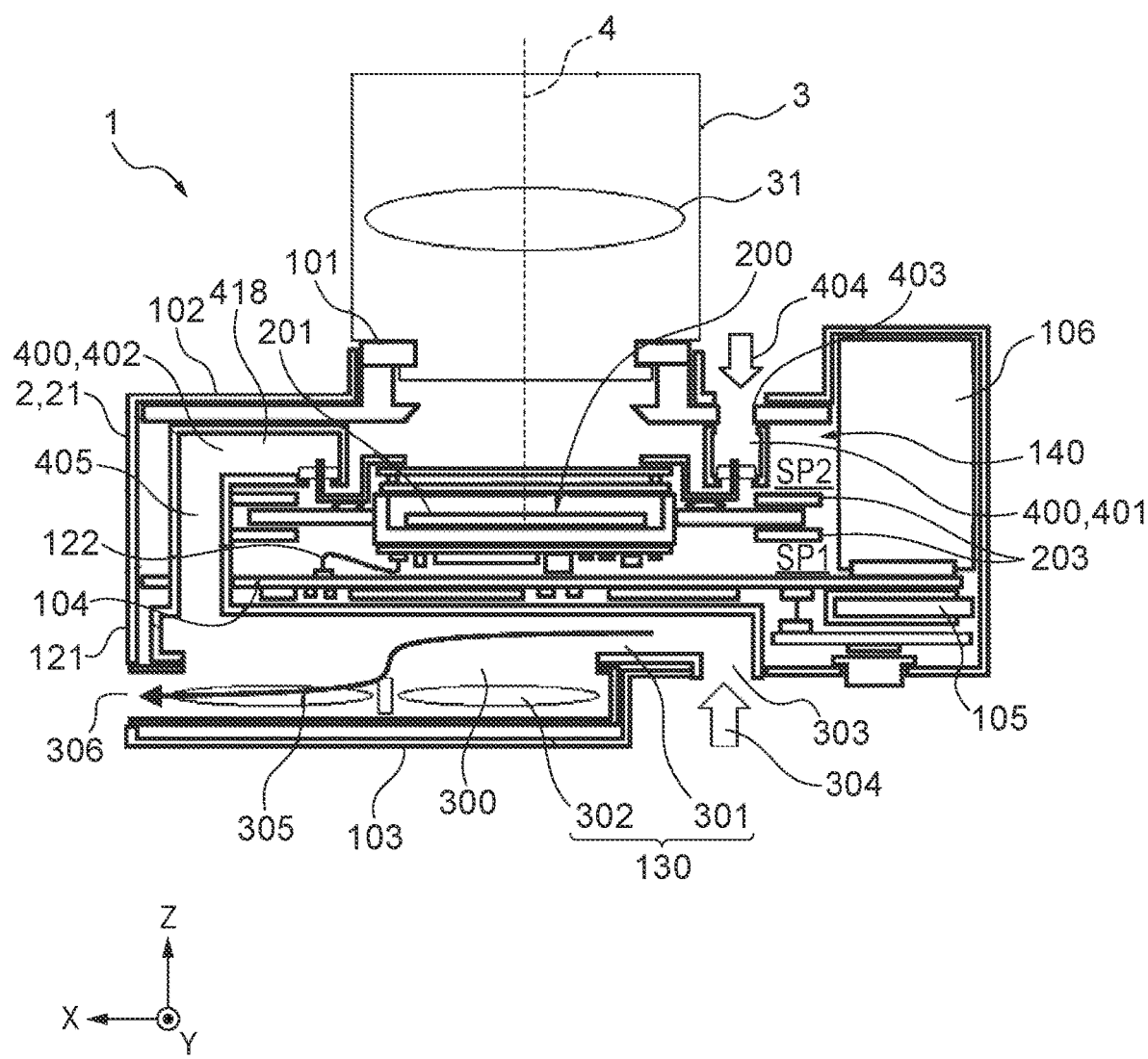
FIG. 1 illustrates a schematic configuration diagram of an image pickup apparatus according to a first embodiment.

FIG. 1 illustrates a schematic configuration diagram of the image pickup apparatus 1 according to the first embodiment. As illustrated in FIG. 1, the image pickup apparatus 1 includes an image pickup apparatus body 2 and a lens barrel 3.

The image pickup apparatus body 2 includes a hollow housing 21. In a front part of the housing 21, that is, on a mount 101 of the housing 21, the lens barrel 3 containing at least one lens 31 is detachably attached (disposed) by, for example, a bayonet method. It should be noted that the lens barrel 3 is configured to be detachably attached to the housing 21, but is not limited to this configuration. The lens barrel 3 may be fixed to the housing 21 in such a way that the lens barrel 3 is restricted from being attached to or detached from the housing 21. Furthermore, it should be noted that, in the present embodiment, a front surface of the housing 21 (image pickup apparatus body 2) on which the mount 101 is disposed will be referred to as a "front surface 102", and a rear surface opposite to the front surface 102 will be referred to as a "rear surface 103".

The image pickup apparatus body 2 includes an image pickup unit 200 in an inner space of the housing 21. The image pickup unit 200 includes an image sensor 201 configured to pick up an optical image formed by the lens 31. The image pickup unit 200 divides the inner space of the housing 21 into a first space SP1 in the rear of the inner space and a second space SP2 in the front of the inner space.

The image pickup apparatus body 2 includes a flexible substrate 122 and a main substrate 104 as electronic components in the first space SP1. The flexible substrate 122 communicably connects the image sensor 201 and the main substrate 104 to each other.

The main substrate 104 is a control board configured to drive and control the image sensor 201 and the like. An optical image formed on the image sensor 201 is converted into electrical information by the image sensor 201 and transferred to the main substrate 104 via the flexible substrate 122. The main substrate 104 is configured to perform operations such as recording in a recording unit 105 electrical information from the image sensor 201 after performing processing necessary for the recording. It should be noted that the electronic components connected to the image sensor 201 are not limited to the flexible substrate 122 and the main substrate 104.

A battery 106 is provided in the inner space of the housing 21. Examples of the battery 106 include a rechargeable battery. The battery 106 is configured to supply power to the image sensor 201 and the main substrate 104.

Hereinafter, how the main substrate 104 is cooled will be described. As illustrated in FIG. 1, the image pickup unit 200 includes a first cooling unit 130 in the first space SP1. The main substrate 104 generates heat in the energized state, and is forcibly cooled by the first cooling unit 130. With this configuration, it is possible to prevent an excessive temperature rise in the main substrate 104, and thus, it is possible to prevent a decrease in the function of the main substrate 104 due to the temperature rise. The first cooling unit 130 is located on the negative side in the Z-axis direction relative to the main substrate 104.

The first cooling unit 130 includes a duct (first duct) 301 and a centrifugal fan (fan) 302. The duct 301 includes a first heat exchanger that exchanges heat with the electronic components, and a first flow path through which air for cooling the electronic components via the first heat exchanger passes. The duct 301 includes a hollow body, and a hollow portion of the hollow body functions as a forced air cooling path (first flow path) 300 through which air for cooling the main substrate 104 (electronic component) passes. The forced air cooling path 300 includes intake ports (first intake ports) 303 through which outside air (air) 304 is sucked, and shared exhaust ports 306 through which air is discharged. The intake ports 303 are openings disposed in a rear part of the housing 21, that is on the rear surface 103. The exhaust ports 306 are openings disposed on a side surface 121 of the housing 21 facing the positive side in the X-axis direction.

Both the intake ports 303 and the exhaust ports 306 are disposed at positions that are hardly blocked by user's fingers or the like when an image is picked up using the image pickup apparatus 1. As a result, air is smoothly sucked from the intake ports 303 and smoothly discharged from the exhaust port 306.

The centrifugal fan 302 is disposed on the negative side in the Z-axis direction in the duct 301. Generating an air flow 305 in the duct 301, the centrifugal fan 302 forces air to pass from the intake ports 303 toward the exhaust ports 306. Then, the air takes heat from the main substrate 104 on the way passing through the duct 301, and is discharged through the exhaust ports 306 together with the heat. With this configuration, the main substrate 104 can be quickly cooled.

Next, the arrangement of the image pickup unit cooling duct 400 will be described. As illustrated in FIG. 1, the image pickup unit 200 includes a second cooling unit 140 in the second space SP2. The image sensor 201 of the image pickup unit 200 generates heat in the energized state, and is forcibly cooled by the second cooling unit 140. With this configuration, an excessive temperature rise in the image sensor 201 can be prevented, and thus, a decrease in the function of the image sensor 201 due to the temperature rise can be prevented. The second cooling unit 140 is located on the positive side in the Z-axis direction relative to image pickup unit 200.

The second cooling unit 140 includes an image pickup unit cooling duct (second duct) 400 including an image pickup unit cooling duct 401 and an image pickup unit cooling duct 402 that communicate with each other. In the present embodiment, the image pickup unit 200 and the main substrate 104 (electronic component) are disposed between the duct 301 and the image pickup unit cooling duct 400.

The image pickup unit cooling duct 400 includes a second heat exchanger that exchanges heat with the image pickup unit 200, and a second flow path through which air for cooling the image pickup unit 200 passes via the second heat exchanger. The image pickup unit cooling duct 400 includes a hollow body, and a hollow portion of the hollow body functions as the forced air cooling path (second flow path) 418 through which air for cooling the image sensor 201 passes. It should be noted that, in the image pickup unit cooling duct 400, the image pickup unit cooling duct 401 is disposed on the upstream side, and the image pickup unit cooling duct 402 is disposed on the downstream side.

The image pickup unit cooling duct 401 and the image pickup unit cooling duct 402 are disposed at positions not overlapping with the image sensor 201 as viewed from the direction of an optical axis 4 of the image sensor 201 (lens 31). This prevents light beams incident from the lens barrel 3 from being blocked by the image pickup unit cooling duct 401 and the image pickup unit cooling duct 402, whereby an optical image is accurately formed on the image sensor 201.

The forced air cooling path 418 includes intake ports (second intake ports) 403 that are disposed in the housing 21 at a position different from the intake ports 303 and through which outside air (air) 404 is sucked. In the present embodiment, the intake ports 403 are openings disposed in the front part of the housing 21. The intake ports 403 are disposed at positions that are hardly blocked by user's fingers or the like when an image is picked up using the image pickup apparatus 1. With this configuration, air is smoothly sucked into the intake ports 403.

The duct 301 and the image pickup unit cooling duct 402 of the image pickup unit cooling duct 400 are coupled to each other via a duct coupling unit (coupling duct) 405. As a result, the image pickup unit cooling duct 402 communicates with the duct 301. With this configuration, outside air 404 sucked from the intake ports 403 and passing through the image pickup unit cooling duct 402 (forced air cooling path 418) is drawn into the duct 301 (forced air cooling path 300) by air flow 305 generated by the centrifugal fan 302. Then, the drawn air is discharged from the exhaust ports 306 together with air sucked from the intake ports 303 and passing through the forced air cooling path 300.

In this manner, the number of exhaust ports can be reduced by using the shared exhaust ports 306, that is, by using the exhaust ports 306 of the forced air cooling path 300 also as exhaust ports of the forced air cooling path 418. Accordingly, the configuration of the second cooling unit 140 can be simplified.

Figure 2A:
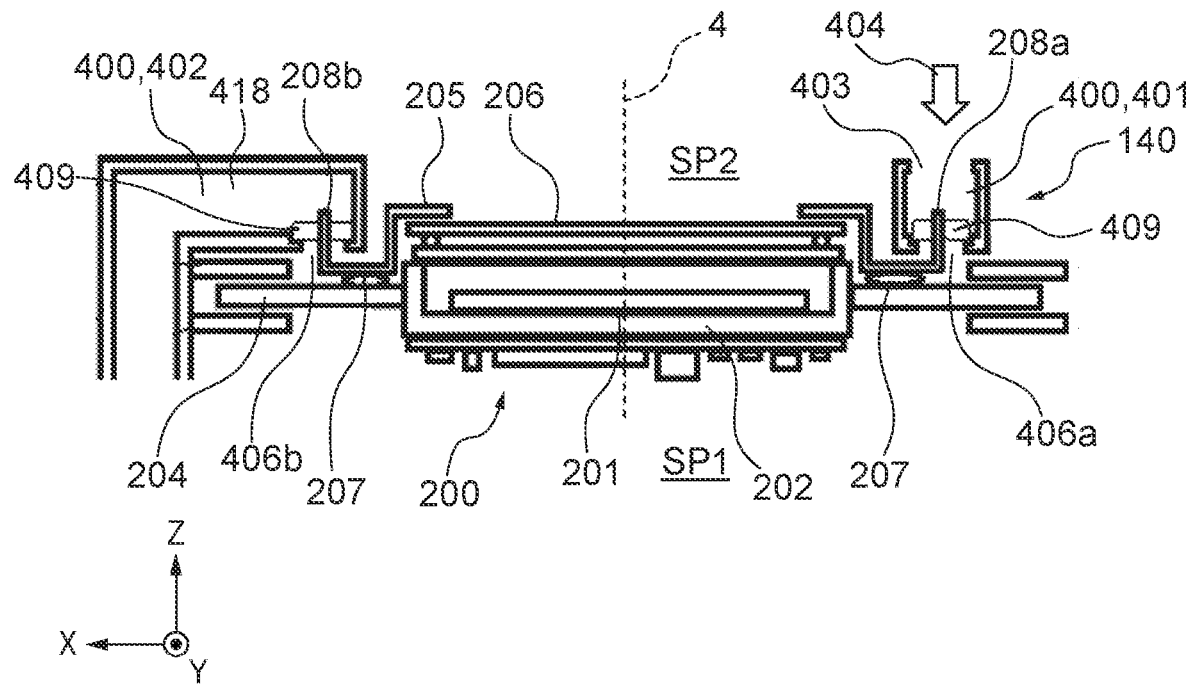
FIGS. 2A and 2B illustrate enlarged diagrams of an image pickup unit and its surroundings in FIG. 1.
Figure 2B:
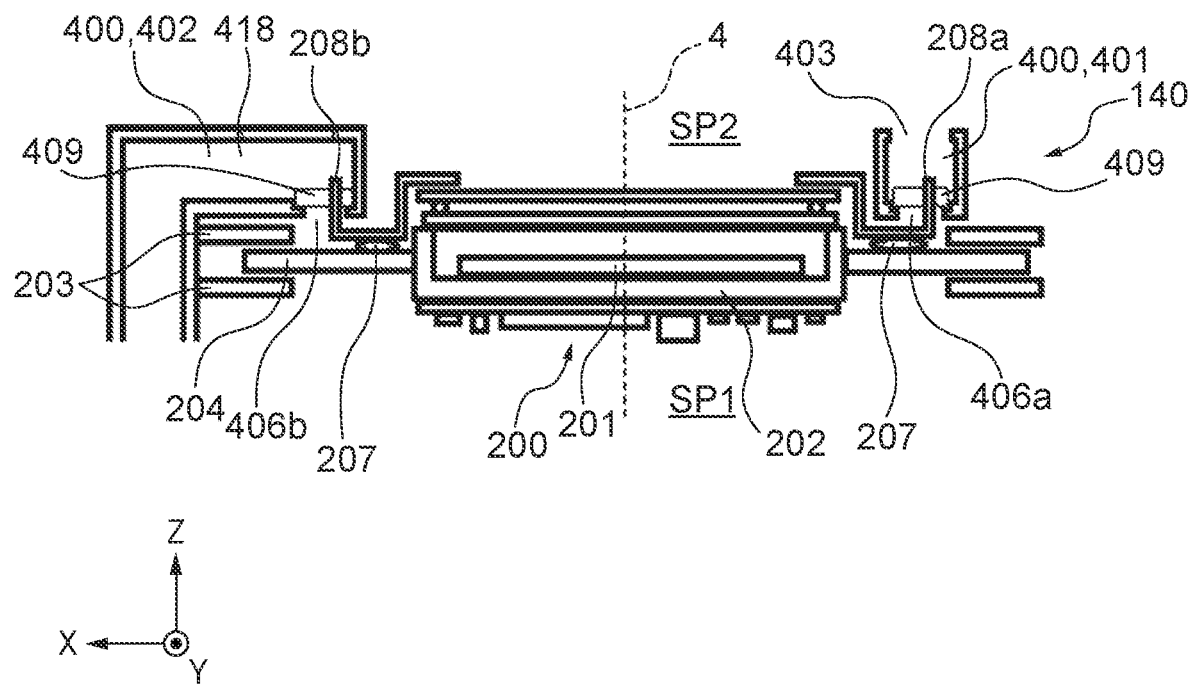

Next, a heat transfer structure of the image pickup unit 200 will be described. FIGS. 2A and 2B illustrate enlarged diagram of the image pickup unit 200 and its surroundings in FIG. 1, and depict cooling function and image-stabilization function, which will be described later, of the image pickup apparatus 1. As illustrated in FIGS. 2A and 2B, the image pickup unit 200 includes an image pickup movable unit 202. The image pickup movable unit 202 includes the image sensor 201, an image sensor holding member (device holding member) 204, an optical filter 206, an optical filter holding member 205, and high thermal conductivity heat-dissipation rubbers 207.

The image sensor 201 includes, for example, a sensor like a CCD or a CMOS, and is a member having a rectangular shape as viewed from the direction of the optical axis 4. A rear surface of the image sensor 201 is held by the image sensor holding member 204. The optical filter 206 is disposed in front of the image sensor 201 and includes, for example, an optical low-pass filter for reducing moire.

A front surface of the optical filter 206 is held by the optical filter holding member 205. The image sensor holding member 204 and the optical filter holding member 205 are made of a material having thermal conductivity, which is not particularly limited, and may be for example, aluminum or the like.

The high thermal conductivity heat-dissipation rubbers 207 having elasticity and thermal conductivity are disposed between the image sensor holding member 204 and optical filter holding member 205. The high thermal conductivity heat-dissipation rubbers 207 each has a front surface in contact with the optical filter holding member 205 and a rear surface in contact with the image sensor holding member 204. The heat generated in the image sensor 201 is transferred to the image sensor holding member 204, the high thermal conductivity heat-dissipation rubbers 207, and the optical filter holding member 205 in this order.

Next, how image-stabilization works for the image pickup unit 200 will be described. As illustrated in FIGS. 2A and 2B, the image pickup apparatus body 2 includes a position control unit 203. The position control unit 203 is a drive mechanism configured to control (adjust) the position of the image pickup unit 200 by driving the image pickup unit 200 within a predetermined range in a direction orthogonal to the optical axis 4 of the image sensor 201. With this position control, the image-stabilization function for the image pickup unit 200 is exerted. It should be noted that, in the present embodiment, the position control unit 203 is provided between the duct 301 and the image pickup unit cooling duct 400. Details of the position control unit 203 will be described later.

Next, how air cooling works for the image sensor 201 and how air cooling and image-stabilization work together will be described. As illustrated in FIG. 2A, the image pickup unit cooling duct 401 is provided with holes (through holes) 406a penetrating a portion of the image pickup unit cooling duct 401 facing the image pickup unit 200 (an end portion on the image pickup unit 200 side). The image pickup unit cooling duct 402 is also provided with holes (through holes) 406b penetrating a portion of the image pickup unit cooling duct 402 facing the image pickup unit 200 (an end portion on the image pickup unit 200 side). The both holes 406a and holes 406b communicate with the forced air cooling path 418. The holes 406a and 406b are filled with viscoelastic filler 409 made of, for example, a gel containing aluminum oxide, or the like.

To the filler 409 in the holes 406a, protrudes (part of the optical filter holding member 205) 208a protruding from the edge of the optical filter holding member 205 are inserted to reach the forced air cooling path 418. Also to the filler 409 in the holes 406b, protrudes 208b of the optical filter holding member 205 are inserted to reach the forced air cooling path 418. As a result, the heat generated in the image sensor 201 and transferred to the optical filter holding member 205 is transferred to air passing through the forced air cooling path 418 via the filler 409. Then, the heat is discharged from the exhaust ports 306 together with the air.

As described above, according to the present embodiment, the filler 409 functions as a heat exchanger (the second heat exchanger) that exchanges heat with the image pickup unit 200. Furthermore, the sizes of the holes 406a and 406b are sufficiently secured. As a result, as illustrated in FIG. 2B, regardless of the position of the image pickup movable unit 202, the protrudes 208a of the optical filter holding member 205 are prevented from coming into contact with (interfering with) the image pickup unit cooling duct 401, and the protrudes 208b are prevented from coming into contact with the image pickup unit cooling duct 402. With this configuration, the image pickup movable unit 202 can move smoothly and sufficiently.

Next, an appearance of the image pickup apparatus will be described. FIGS. 3A to 3E are perspective views, a top view, and a front view of the image pickup apparatus 1. As illustrated in the perspective view of FIG. 3A, the image pickup apparatus body 2 includes the annular mount 101 formed to protrude from the front surface 102 of the image pickup apparatus body 2. The lens barrel 3 is detachably attachable to the mount 101 by, for example, a bayonet method. From the front surface 102 of the image pickup apparatus body 2, a convex portion 107 protrudes. The convex portion 107 functions as a gripping portion gripped by a user when the user uses the image pickup apparatus 1. The inside of the convex portion 107 functions as a storage portion in which the battery 106 is stored.

Figure 3A:
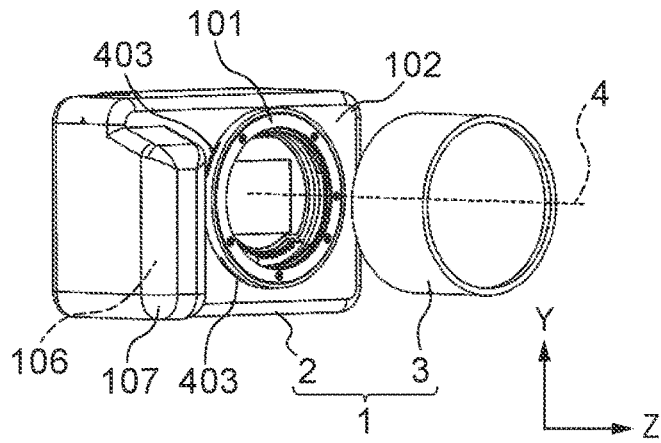
FIGS. 3A to 3E illustrate perspective views, a top view, and a front view of the image pickup apparatus.
Figure 3B:
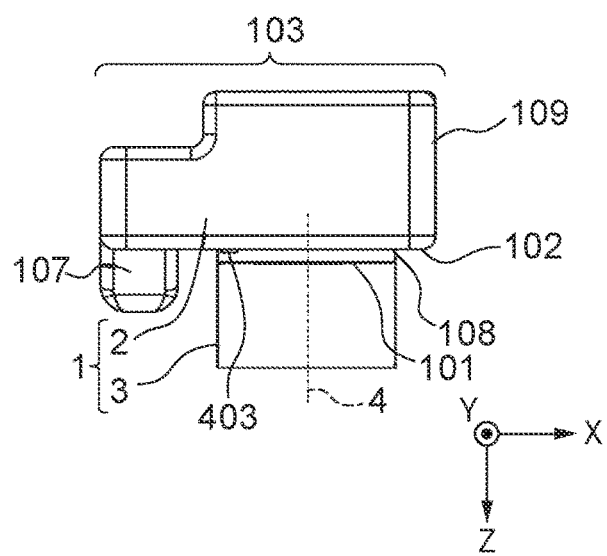

As illustrated in the top view of FIG. 3B, the intake ports 403 are provided on the side surface 108 of the mount 101 on the side facing the convex portion 107. The arrangement positions of the intake ports 403 are, for example, positions that are not covered by the user's fingers when the user holds the convex portion 107 with the right hand and holds the lens barrel 3 with the left hand. In particular, in the present embodiment, the intake ports 403 are arranged in the vicinity of the boundary between the front surface 102 and the side surface 108, and it is possible to prevent the intake ports 403 from being covered by use's fingers or from being blocked by user's fingers regardless of how the user holds. With this configuration, outside air 404 can be sufficiently supplied from the intake ports 403 to the image pickup unit cooling duct 401.

Figure 3C:
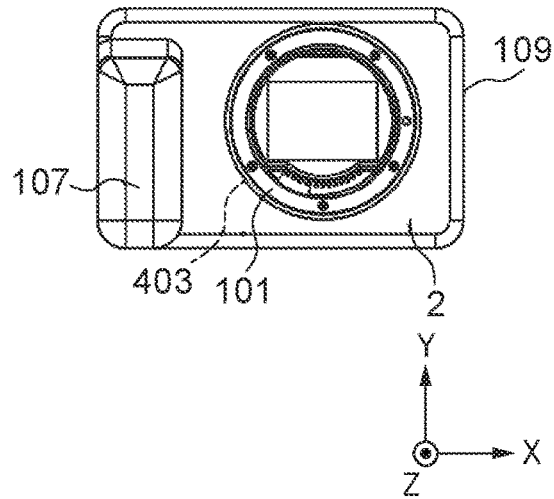

Furthermore, as illustrated in the front view of FIG. 3C, when the image pickup apparatus body 2 is viewed from the front, the intake ports 403 are in a hard-to-see position. With this configuration, it is possible to reduce the influence of the intake ports 403 on the design of the image pickup apparatus body 2. It should be noted that the number of intake ports 403 to be disposed is two in the configuration illustrated in FIG. 3A, but is not limited thereto, and may be, for example, one or three or more.

Figure 3D:
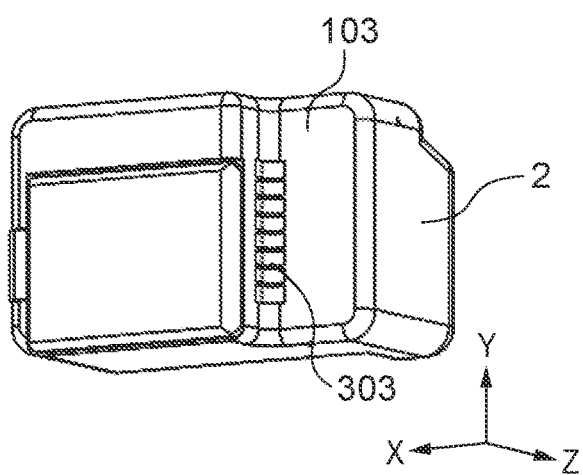

As illustrated in the perspective view of FIG. 3D, the intake ports 303 are disposed on the rear surface 103 of the image pickup apparatus body 2. The number of the intake ports 303 to be disposed is eight in the configuration illustrated in FIG. 3D, but is not limited thereto, and may be, for example, one to seven or nine or more.

Figure 3E:
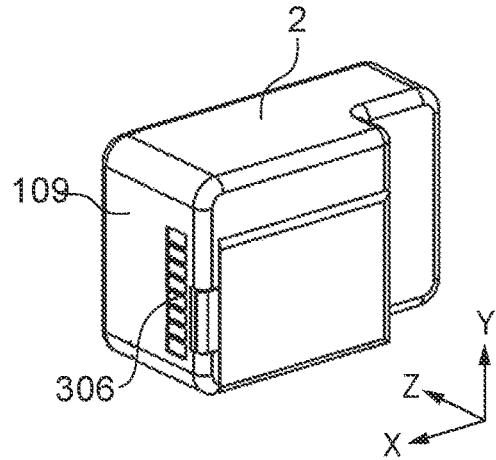

As illustrated in the perspective view of FIG. 3E, the exhaust ports 306 are disposed on a side surface 109 of the image pickup apparatus body 2, located on the opposite side to the convex portion 107. The number of the exhaust ports 306 to be disposed is eight in the configuration illustrated in FIG. 3E, but is not limited thereto, and may be, for example, one to seven or nine or more.

Figure 4:
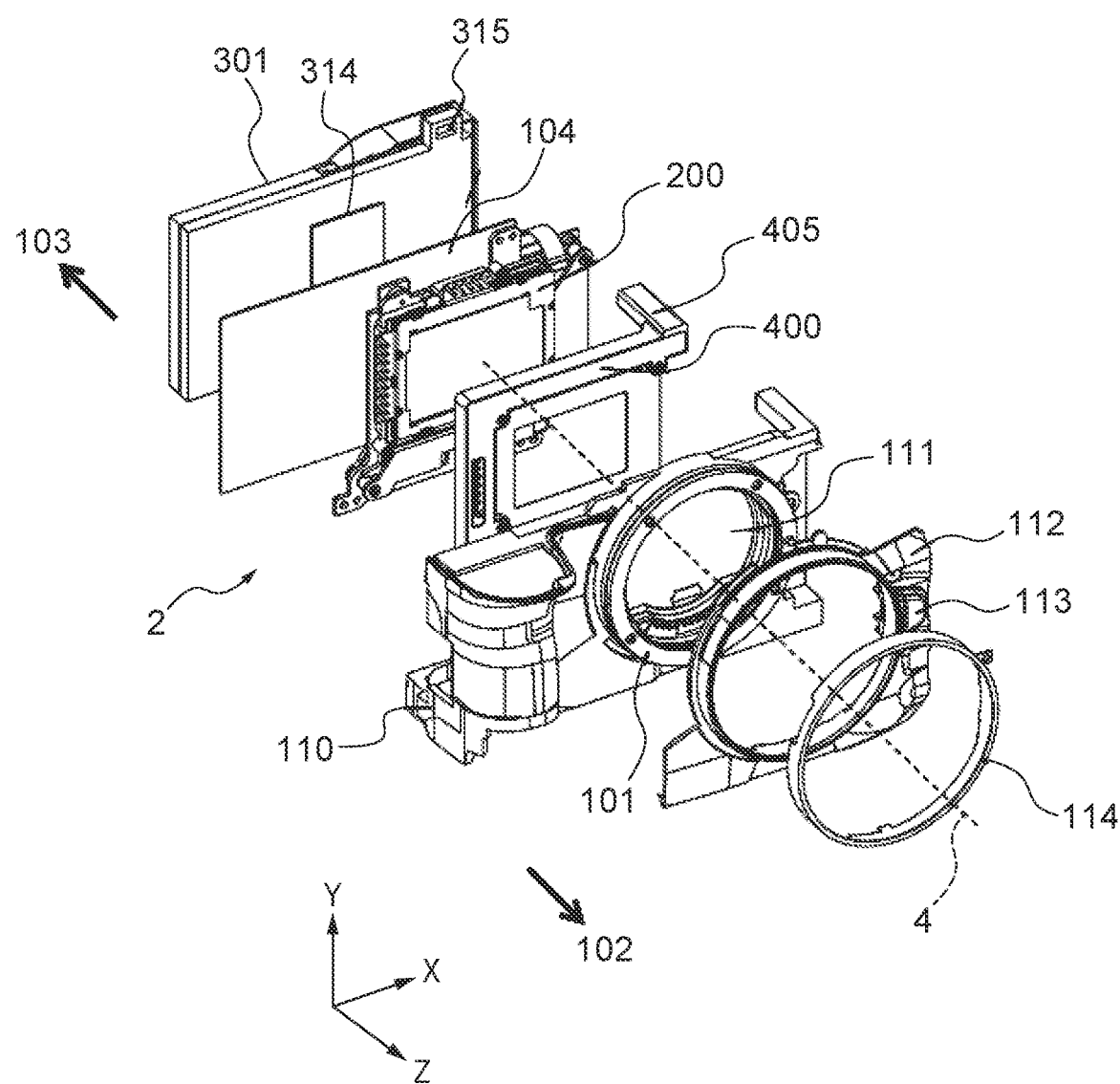
FIG. 4 illustrates an exploded perspective diagram of a part of an internal structure of the image pickup apparatus.

Next, an internal structure of the image pickup apparatus 1 will be described. FIG. 4 is an exploded perspective diagram of a part of the internal structure of the image pickup apparatus 1. As illustrated in FIG. 4, the image pickup apparatus body 2 includes a base member 110, an operation unit holding member 112, and a decorative ring 114, and these members are arranged in this order from the negative side in the Z-axis direction.

The base member 110 is one of components that ensure the rigidity of the image pickup apparatus body 2, and has an opening 111 in a circular shape. The mount 101 is disposed and fixed concentrically with the opening 111.

The operation unit holding member 112 is made of a slidable resin. The operation unit holding member 112 movably supports a push button 113 as an operation unit to be operated by a user. In the operation unit holding member 112, the decorative ring 114 is disposed concentrically with the mount 101 (the opening 111 of the base member 110). On the other hand, on the rear surface 103 side of the base member 110, the image pickup unit cooling duct 400, the image pickup unit 200, the main substrate 104, and the duct 301 are disposed in this order from the positive side in the Z-axis direction.

Figure 5A:
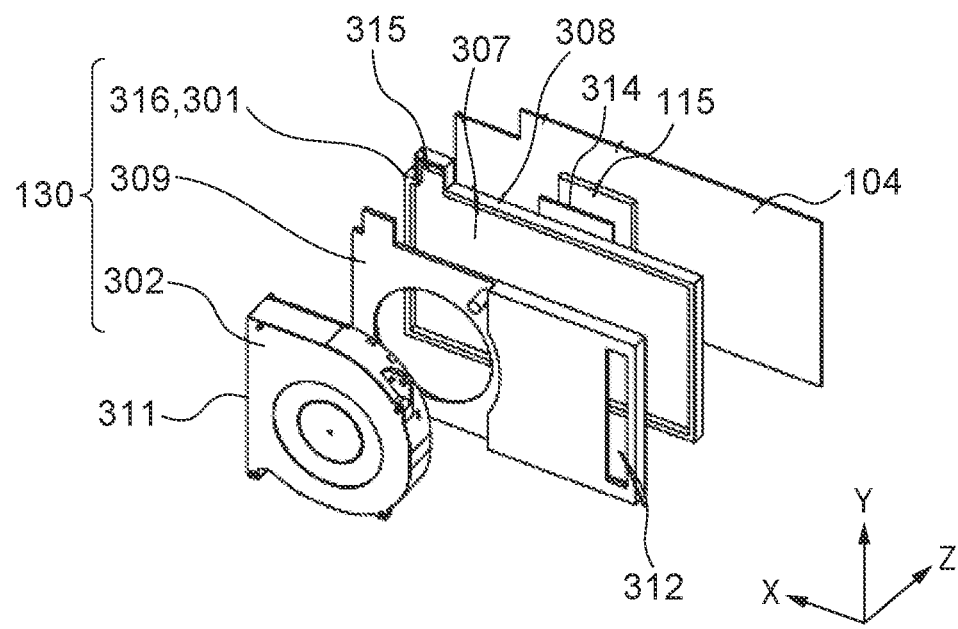
FIGS. 5A and 5B illustrate exploded perspective diagrams for explaining cooling of an element group mounted on a main substrate.
Figure 5B:
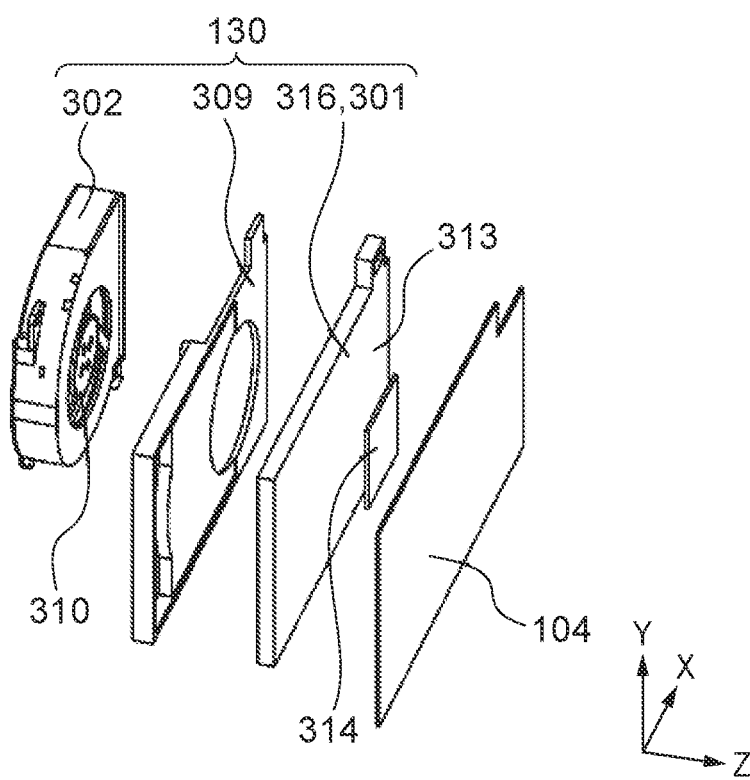

Next, how to cool the main substrate 104 will be described. FIGS. 5A and 5B are exploded perspective diagrams for explaining cooling of an element group mounted on the main substrate 104.

As illustrated in FIG. 5A, an element group 115 including a plurality of circuit elements and the like is mounted on the main substrate 104 on the negative side in the Z-axis direction. The duct 301 includes a box-shaped body 316 including a base plate 307 and side walls 308, and a plate-shaped duct lid member 309 covering the body 316 from the negative side in the Z-axis direction.

As illustrated in FIG. 5B, plate-shaped heat-dissipation rubber 314, which is made of a member having elasticity and thermal conductivity (high thermal conductivity), is disposed on a surface 313 of the base plate 307 of the body 316, the surface 313 facing the element group 115. The heat-dissipation rubber 314 is in close contact with (in contact with) the surface 313 of the body 316 and with the element group 115 of the main substrate 104. This configuration ensures that the heat of the element group 115 is quickly transferred to the duct 301 via the heat-dissipation rubber 314, thus cooling the element group 115. As described above, heat-dissipation rubber 314 functions as a heat exchanger (the first heat exchanger) that exchanges heat between the duct 301 and the main substrate 104 (the electronic component).

The duct 301 includes the body 316 and the duct lid member 309 as described above, which are assembled to form the forced air cooling path 300 inside. The duct lid member 309 has an opening 312 connected to the intake ports 303.

The centrifugal fan 302 includes an intake unit 310 facing the forced air cooling path 300 and an exhaust unit 311 connected to the exhaust ports 306. When the centrifugal fan 302 generates an air flow, air (outside air 304) is supplied from the intake ports 303 to the forced air cooling path 300. This air passes through the forced air cooling path 300 (the duct 301) and the centrifugal fan 302 in this order and is discharged from the exhaust ports 306. The air takes away the heat of the element group 115 transferred through the heat-dissipation rubber 314 while passing through the forced air cooling path 300. Accordingly, the element group 115 can be cooled.

Figure 6:
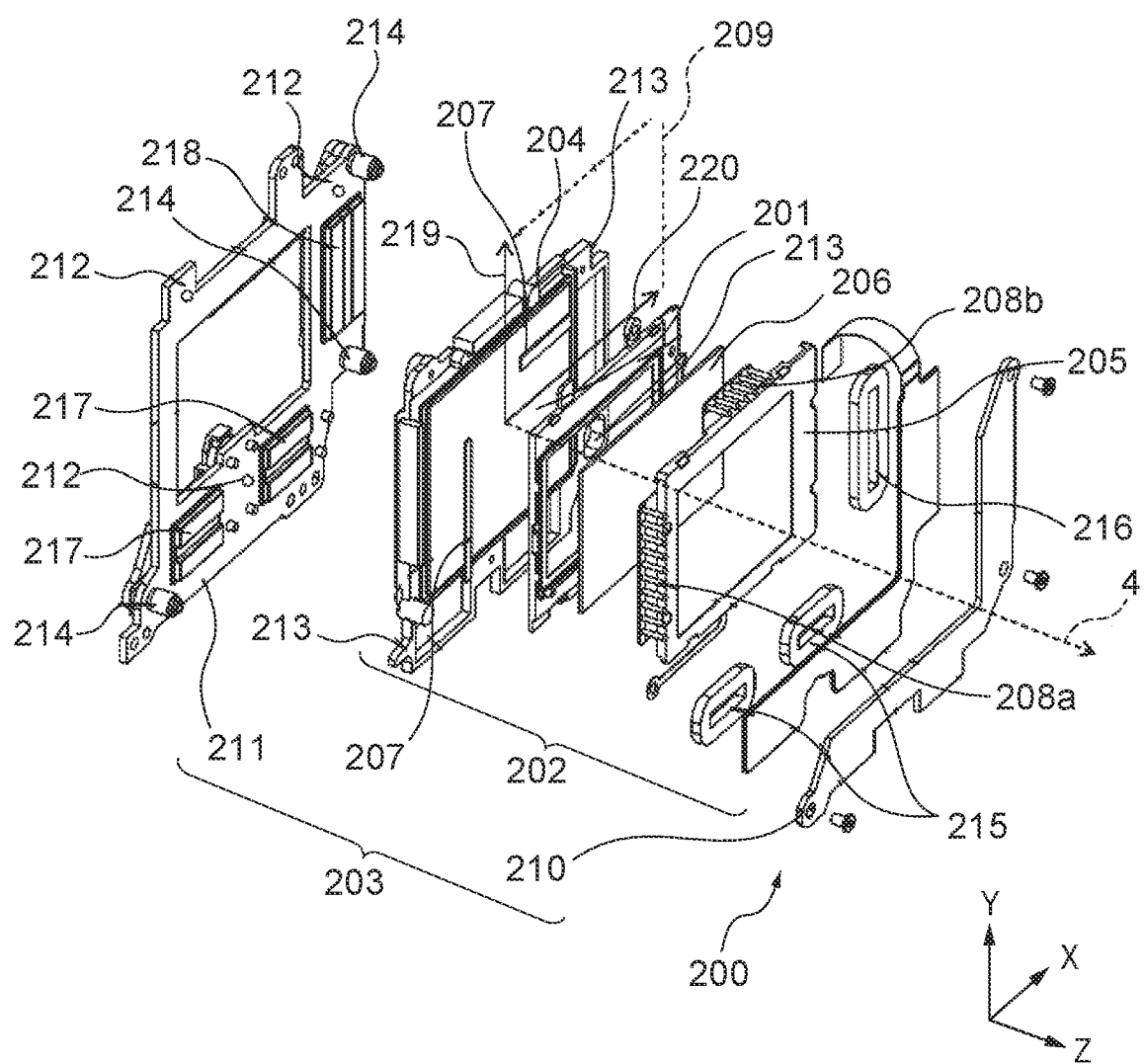
FIG. 6 illustrates an exploded perspective diagram of the image pickup unit.

Next, a basic structure and a heat transfer structure of the image pickup unit 200 and how image-stabilization works will be described. FIG. 6 illustrates an exploded perspective diagram of the image pickup unit 200. As illustrated in FIG. 6, the image pickup unit 200 includes the image pickup movable unit 202. The image pickup movable unit 202 is held and movably supported by the position control unit 203 from the front surface 102 side and the rear surface 103 side.

The position control unit 203 is configured to control the position of the image pickup movable unit 202 on the virtual plane 209 orthogonal to the optical axis 4 within a predetermined range by a known method which will be described later. The image pickup movable unit 202 includes the image sensor 201, the image sensor holding member 204, the optical filter 206, and the optical filter holding member 205.

The image sensor holding member 204 is a thermally conductive metal member that holds the image sensor 201 and is thermally connected to the image sensor 201. The optical filter holding member 205 is fixed to the image sensor holding member 204. The optical filter holding member 205 includes the protrudes 208a and the protrudes 208b that protrude toward the positive side in the Z-axis direction. The optical filter holding member 205 is a member that holds the optical filter 206, and is in close contact with the image sensor holding member 204 via the high thermal conductivity heat-dissipation rubbers 207 in the vicinity of the protrudes 208a and the protrudes 208b.

Furthermore, an image-stabilization mechanism of the image pickup apparatus 1 will be described with reference to FIG. 6. The position control unit 203 includes a front holding member 210 located on the front surface 102 side and a rear holding member 211 located on the rear surface 103 side, and the image pickup movable unit 202 is held between these holding members.

Ball members 212 are interposed between the position control unit 203 and the image sensor holding member 204. Thus, the image pickup movable unit 202 can smoothly move along the virtual plane 209 within a range in which movable-unit-side regulating portions 213 and position-control-unit-side regulating portions 214 do not abut on each other, where the movable-unit-side regulating portions 213 are portions that regulate the movement limit of the image pickup movable unit 202 in the Z-axis direction and the position-control-unit-side regulating portions 214 are portions that regulate the position of the position control unit 203.

Coils 215 and a coil 216 electrically connected to the main substrate 104 are fixed to the image pickup movable unit 202. On the rear holding member 211, permanent magnets 217 are fixed at positions facing the coils 215, and a permanent magnet 218 is fixed at a position facing the coil 216. When the coils 215 and the coil 216 are in the energized state, this configuration generates force in the direction along the virtual plane 209, that is, force 219 in the Y-axis direction and/or force 220 in the X-axis direction. This makes it possible to control the position of the image pickup movable unit 202, and thus prevent image blurring by adjusting the position of the image pickup movable unit 202 on the basis of vibration applied from the outside.

Figure 7:
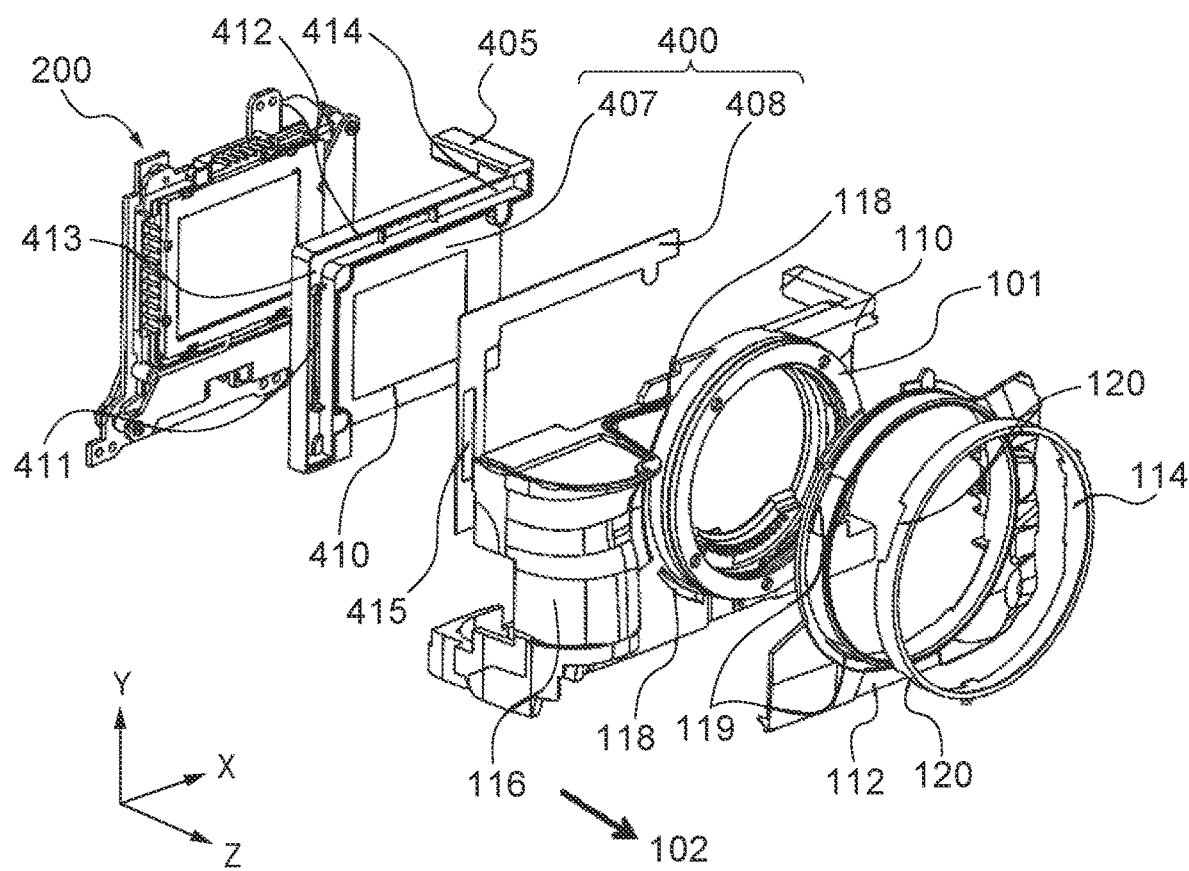
FIG. 7 illustrates an exploded perspective diagram for explaining a structure of a cooling duct for the image pickup unit.
Figure 8A:
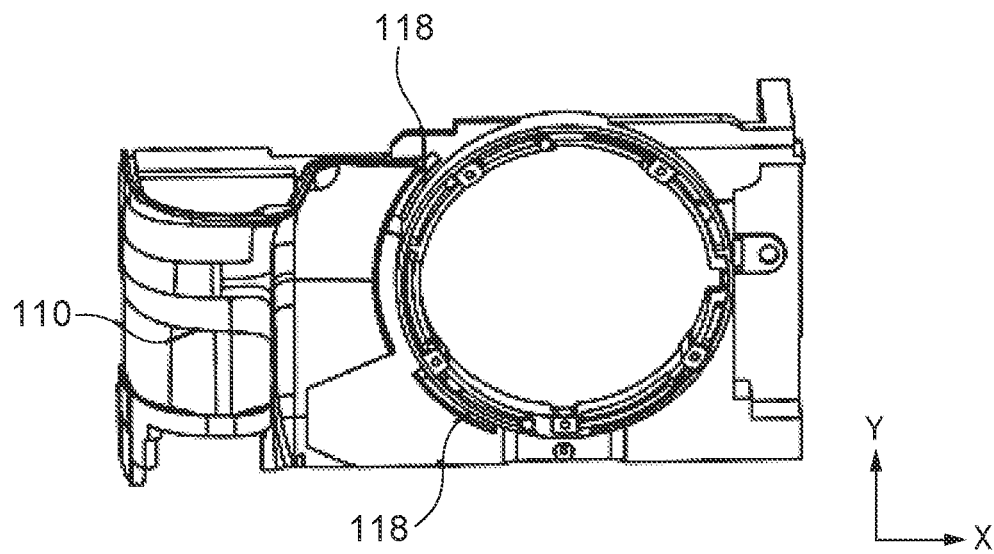
FIGS. 8A and 8B illustrate perspective views of a base member.
Figure 8B:
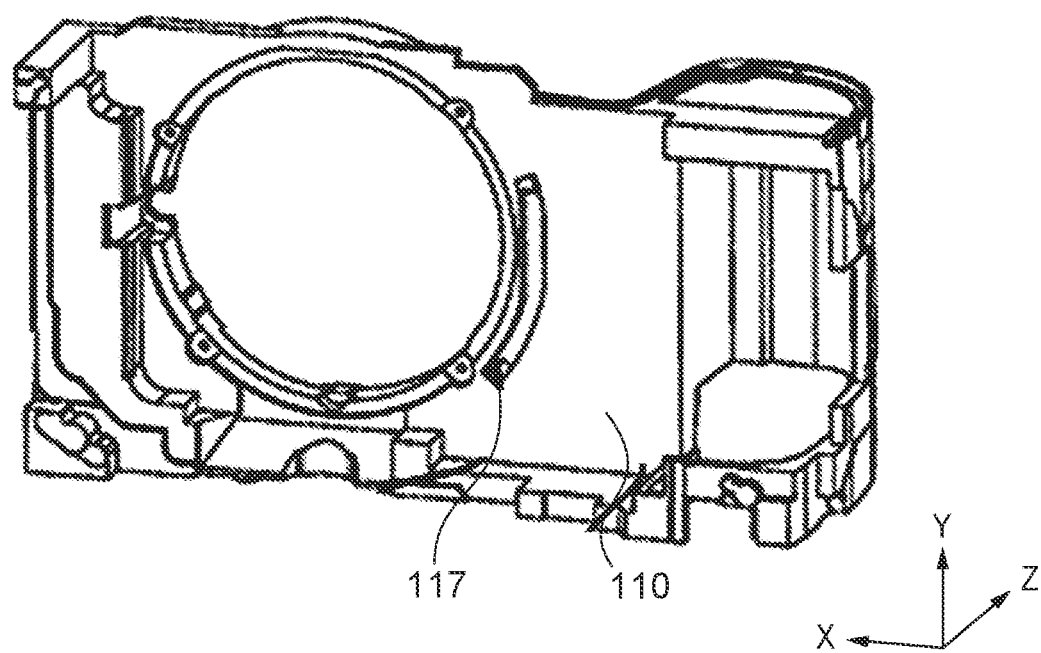
Figure 9:
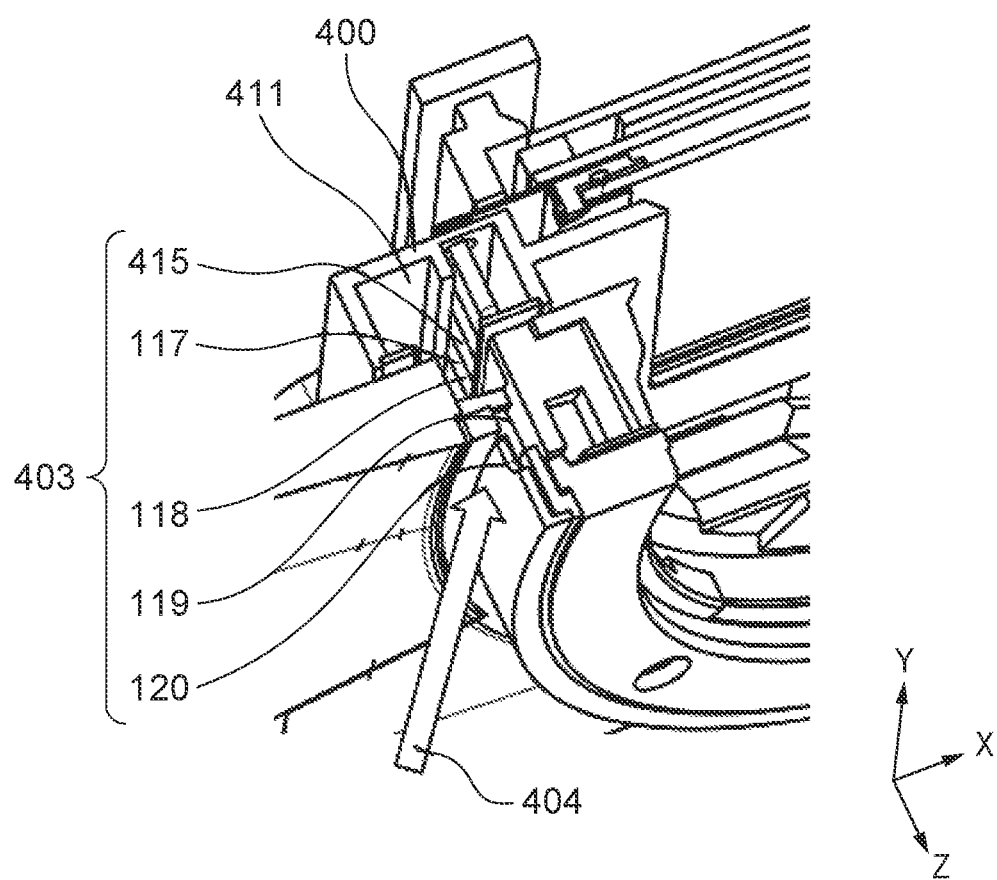
FIG. 9 illustrates a perspective cross-sectional diagram for explaining a structure of the cooling duct for the image pickup unit.

Next, the image pickup unit cooling duct 400 will be described. FIG. 7 illustrates an exploded perspective diagram for explaining a structure of image pickup unit cooling duct 400. FIGS. 8A and 8B illustrate perspective diagrams of the base member 110. FIG. 9 illustrates a perspective cross-sectional diagram for explaining a structure of the image pickup unit cooling duct 400.

As illustrated in FIG. 7, the image pickup unit cooling duct 400 includes a duct body 407 and a duct lid member 408. The duct body 407 includes an opening mask 410, a groove 411, a groove 412, and the duct coupling unit 405. The opening mask 410 is a portion that blocks unnecessary light to the image sensor 201 and has a shape of rectangular frame. The groove 411 is disposed between the mount 101 and a battery housing portion 116 outside the opening mask 410, as viewed from the front surface 102 of the image pickup apparatus body 2, and runs in the Y-axis direction. The groove 412 runs in the X-axis direction from an end portion 413 of the groove 411 toward the opposite side to the battery housing portion 116.

The image pickup unit cooling duct 401 includes a portion constituted by the groove 411, and the portion extends along one side of rectangular image sensor 201 as viewed from the direction of optical axis 4. The image pickup unit cooling duct 402 includes a portion constituted by the groove 412, and the portion extends along another side of rectangular image sensor 201, which is adjacent to the above one side of image sensor 201, as viewed from optical axis 4. In other words, as viewed from the optical axis 4 direction of the image sensor 201, the image pickup unit cooling duct 401 and the image pickup unit cooling duct 402 have portions extending along two adjacent sides of the rectangular image sensor 201. With this configuration, the image pickup unit cooling duct 401 and the image pickup unit cooling duct 402 do not overlap with the image sensor 201 as viewed from the direction of the optical axis 4. As a result, as described above, light beams incident from the lens barrel 3 are prevented from being blocked by the image pickup unit cooling duct 401 and the image pickup unit cooling duct 402.

As viewed from the direction of the optical axis 4, the position control unit 203 overlaps with the image pickup unit cooling duct 401 and the image pickup unit cooling duct 402 (the portions extending along two adjacent sides of the rectangular image sensor 201). With this configuration, the space on the rear side of the image pickup unit cooling duct 401 and the image pickup unit cooling duct 402 can be effectively used as a part of a room for the position control unit 203, which contributes to downsizing of the image pickup apparatus 1.

The duct coupling unit 405 is disposed at an end portion 414 of the groove 412 opposite to the end portion 413, and is connected to a duct connection port 315 (see FIG. 5A). The duct coupling unit 405 extends toward the negative side in the Z axis direction of the image sensor 201 (along the direction of the optical axis 4), and is disposed at a position not overlapping with the image sensor 201 as viewed from the direction of the optical axis 4. This prevents light beams incident from the lens barrel 3 from being blocked by the duct coupling unit 405. As viewed from the bottom side of housing 21, the duct coupling unit 405 is disposed at a position not overlapping with the position control unit 203.

The duct lid member 408 collectively covers the groove 411 and the groove 412. An opening 415 is formed in a portion of the duct lid member 408 facing the groove 411. As illustrated in FIGS. 8A and 8B, the base member 110 includes a recess 117 formed in a portion facing the opening 415, and a plurality of recesses 118 formed in portion on the front surface 102 side. As illustrated in FIG. 9, the recess 117 and the recesses 118 communicate with each other. The operation unit holding member 112 has a hole 119 in a portion facing the recesses 118. The decorative ring 114 has a notch 120 in a portion facing the hole 119.

The intake port 403 includes the notch 120, the hole 119, the recess 118, the recess 117, and the opening 415, and is connected to a groove 411 of image pickup unit cooling duct 400. Outside air 404 supplied from the intake port 403 sequentially passes through the image pickup unit cooling duct 400 and the duct coupling unit 405, and flows into the forced air cooling path 300 from the duct connection port 315.

Figure 10:
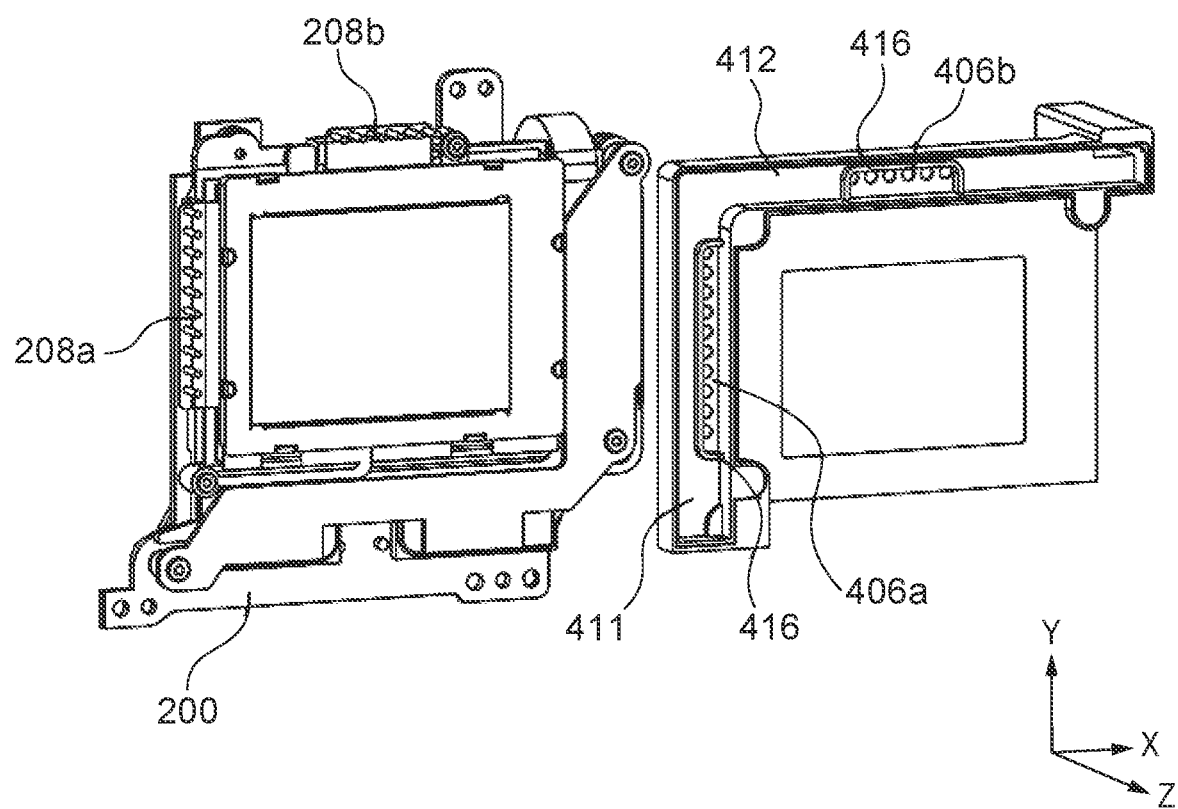
FIG. 10 illustrates an exploded perspective diagram for explaining cooling of the image pickup unit.
Figure 11A:
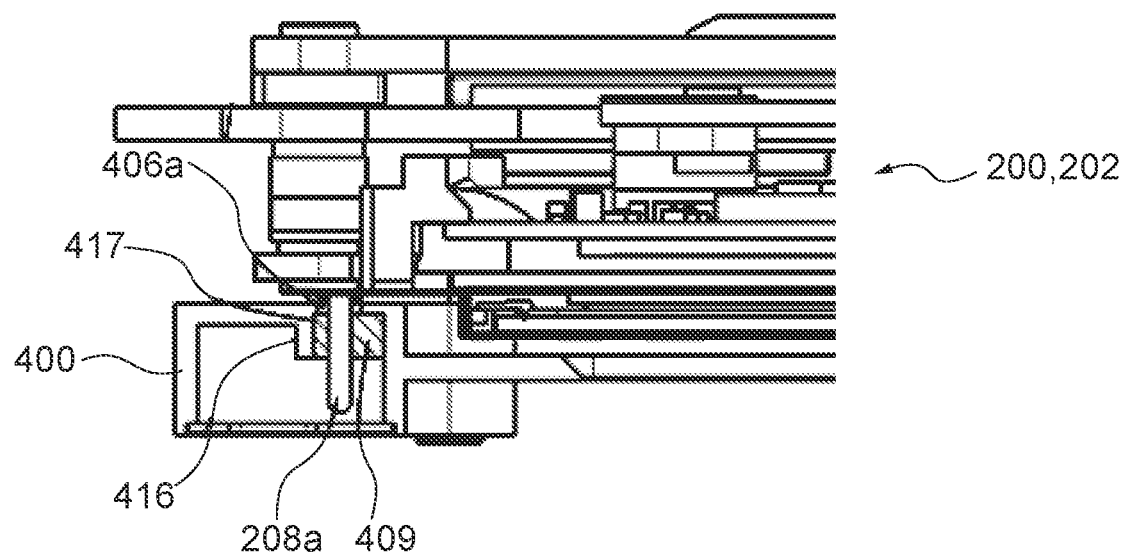
FIGS. 11A and 11B illustrate cross-sectional diagrams for explaining cooling of the image pickup unit.
Figure 11B:
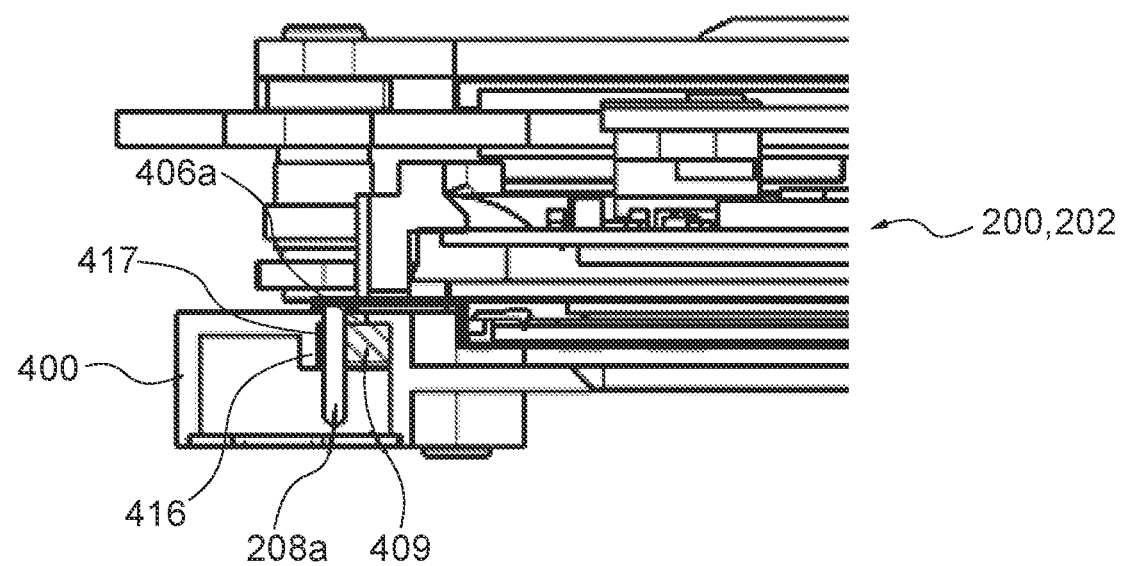

Next, how air cooling works for the image pickup unit 200 and how air cooling and image-stabilization work together will be described. FIG. 10 illustrates an exploded perspective diagram for explaining cooling of the image pickup unit 200. FIGS. 11A and 11B illustrate cross-sectional views for explaining cooling of the image pickup unit 200.

As illustrated in FIG. 10, a plurality of holes 406a are provided in the bottom surface of the groove 411, and a plurality of holes 406b are provided in the bottom surface of the groove 412. A rib 416 is provided so as to surround these holes 406a (the same applies to the holes 406b).

Each of the holes 406a has enough size to allow corresponding one of the protrudes 208a of the optical filter holding member 205 to be inserted therethrough, and to prevent contact with corresponding one of the protrudes 208a regardless of the movement amount of the image pickup unit 200 (the image pickup movable unit 202). Each of the holes 406b has enough size to allow corresponding one of the protrudes 208b to be inserted therethrough, and to prevent contact with corresponding one of the protrudes 208b regardless of the movement amount of the image pickup unit 200. These prevent the movement of the image pickup unit 200 from being hindered by the contact.

As illustrated in FIG. 11A, a recess 417 (including the holes 406a) surrounded by the rib 416 is filled with the filler 409 (the same applies to the holes 406b). Accordingly, the image pickup unit cooling duct 400 is sealed with the filler 409. As illustrated in FIG. 11B, even if the protrudes 208a (the image pickup movable unit 202) move, the filler 409 follows the movement to maintain the sealed state of the image pickup unit cooling duct 400.

Since the filler 409 is made of gel, the movement of the protrudes 208a is not restricted. The protrudes 208a are exposed to the inside of the image pickup unit cooling duct 400, and the heat of the image pickup unit 200 is released to the image pickup unit cooling duct 400.

As described above, according to the present embodiment, the image pickup apparatus 1 has enough space where the position control unit 203 capable of applying image stabilization to the image pickup unit 200 can be arranged, while being small in size. Furthermore, the second cooling unit 140 can quickly cool the image sensor 201 so as to allow the image sensor 201 to stably pick up high-quality images. Furthermore, the first cooling unit 130 can quickly cool the main substrate 104 so as to allow the main substrate 104 to stably and smoothly execute various processes.

Second Embodiment

Figure 12:
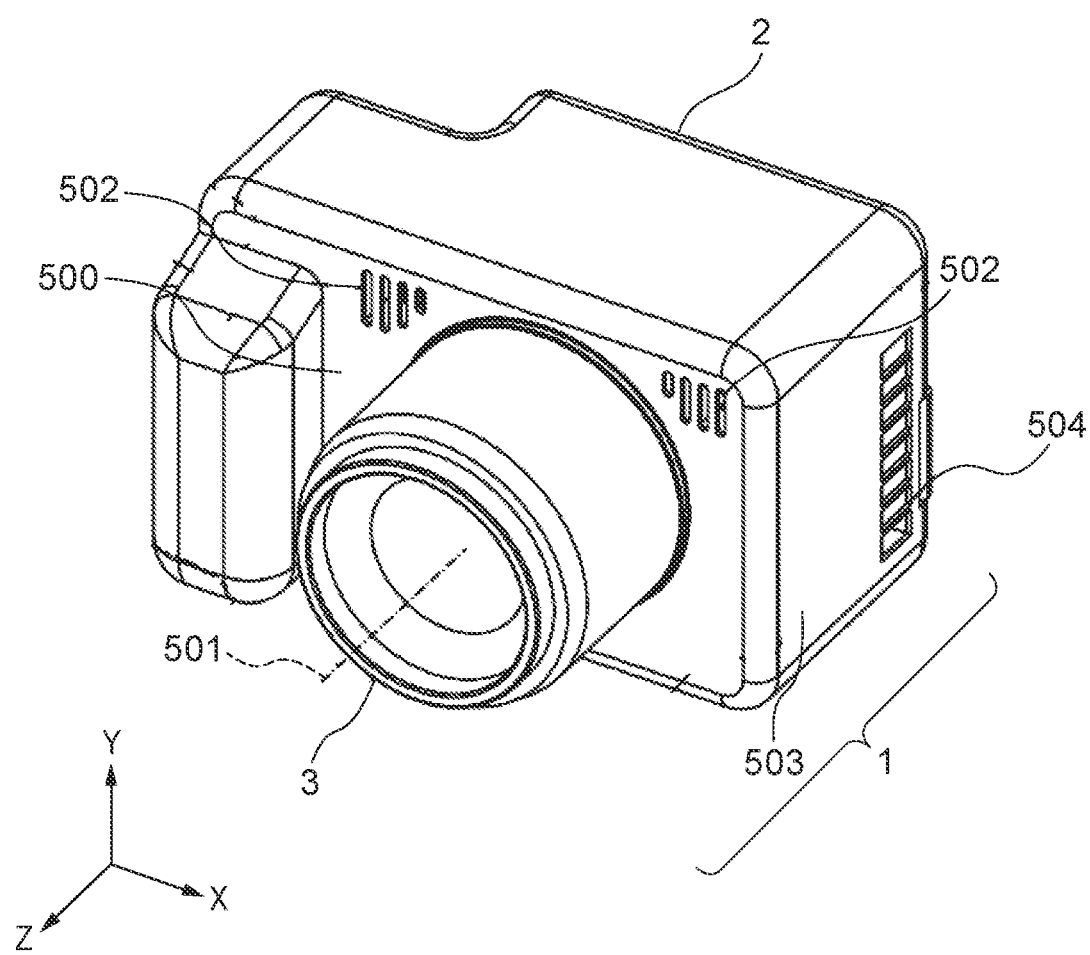
FIG. 12 illustrates a schematic configuration diagram of an image pickup apparatus according to a second embodiment.
Figure 13A:
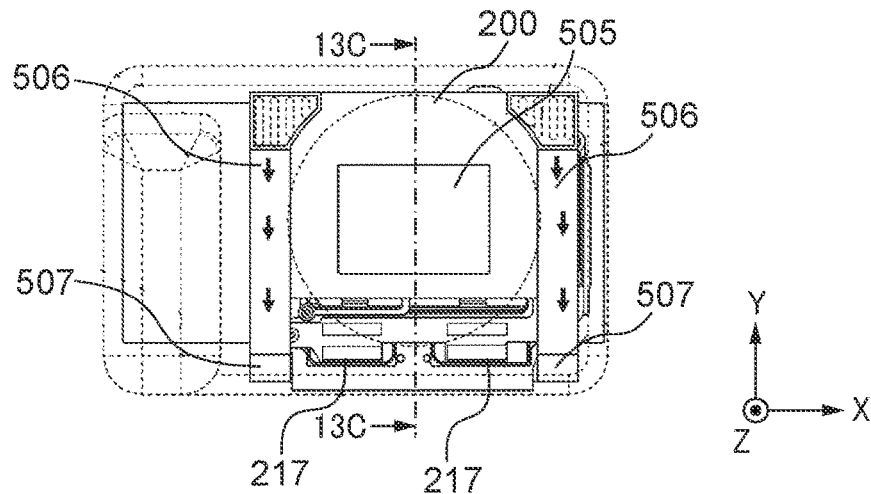
FIGS. 13A to 13C illustrate diagrams for depicting an internal structure of the image pickup apparatus.
Figure 13B:
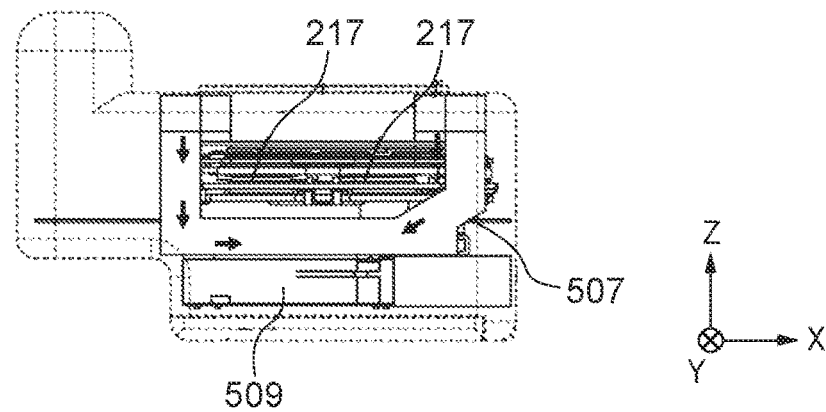
Figure 13C:
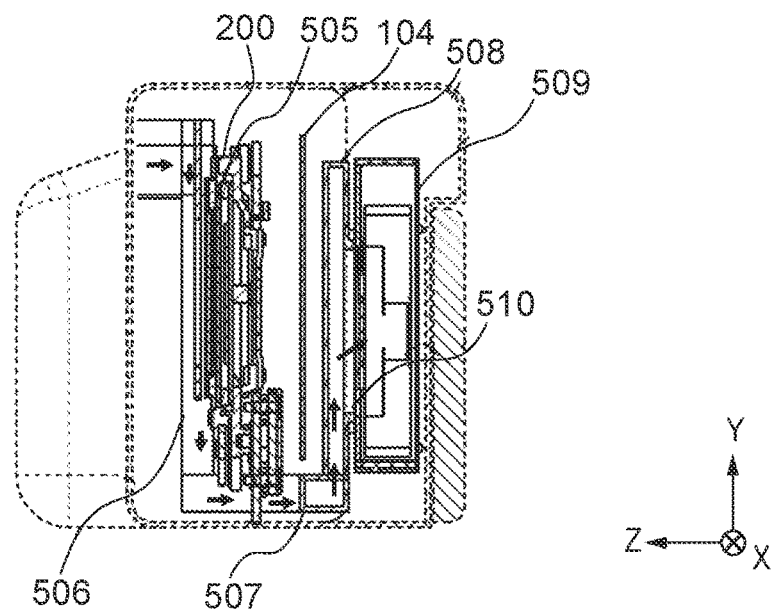

Hereinafter, a second embodiment will be described with reference to FIGS. 12 and 13A to 13C. It should be noted that differences from the above-described embodiment will be mainly described, and description of similar matters will be omitted. FIG. 12 illustrates a schematic configuration diagram of the image pickup apparatus 1 according to the second embodiment. FIGS. 13A to 13C illustrate diagrams for depicting the internal structure of the image pickup apparatus 1. FIG. 13A illustrates a diagram (front view) of the image pickup apparatus 1 as viewed from the subject side. FIG. 13B illustrates a bottom view of the image pickup apparatus 1. FIG. 13C is a cross-sectional view taken along the line 13C-13C in FIG. 13A.

As illustrated in FIG. 12, intake ports 502 are disposed above an optical axis 501 on a front surface 500 of the image pickup apparatus body 2. In the present embodiment, the intake ports 502 are disposed on both sides of lens barrel 3. Exhaust ports 504 are disposed on a right side surface 503 of the image pickup apparatus 1.

As illustrated in FIG. 13A, hollow image pickup unit cooling ducts 506 run on both sides of the image sensor 505. The image pickup unit cooling ducts 506 are configured to cool the image sensor 505. An air flow is generated in each image pickup unit cooling duct 506 by the operation of a centrifugal fan 509 which will be described later. Then, the heat generated in the image sensor 505 is discharged by the air flow.

The image pickup unit cooling ducts 506 are disposed between the mount 101 and the image pickup unit 200. The heat exchange mechanism that exchanges heat between the image sensor 505 and the image pickup unit cooling ducts 506 is similar to that of the first embodiment.

The image pickup unit cooling ducts 506 are connected to respective ends of a duct coupling unit 507 at their bottom portions. The duct coupling unit 507 communicates with the image pickup unit cooling ducts 506, and an air flow from the image pickup unit cooling ducts 506 reaches the duct coupling unit 507.

As illustrated in FIG. 13B, the ends of duct coupling unit 507 extend rearward through both sides of the permanent magnets 217, join together behind the permanent magnets 217, and are connected to a main duct 508. The main duct 508 communicates with the duct coupling unit 507, and the air flows from the image pickup unit cooling ducts 506 reach the main duct 508 through the duct coupling unit 507. As illustrated in FIG. 13C, the main duct 508 is disposed facing the main substrate 104.

The main duct 508 has an opening 510 on a rear surface thereof and the centrifugal fan 509 is connected to the opening 510. Air (outside air) flows in the image pickup unit cooling ducts 506 from the intake ports 502 by the operation of the centrifugal fan 509. The air sequentially passes through the image pickup unit cooling ducts 506, the duct coupling unit 507, and the main duct 508. Accordingly, the forced air cooling path 300 includes the image pickup unit cooling ducts 506, the duct coupling unit 507, and the main duct 508.

The heat generated by the main substrate 104 is transferred to the main duct 508 via the heat-dissipation rubber 314. This heat is discharged from the exhaust ports 504 by the air flow in the main duct 508.

As described above, according to the present embodiment, the image sensor 505 is cooled by the image pickup unit cooling ducts 506 provided on both sides of the image sensor 505. As a result, the image sensor 505 can be cooled more quickly, and cooling unevenness can be prevented, that is, the entire image sensor 505 can be uniformly cooled.

According to the present embodiment, the duct coupling unit 507 that connects the image pickup unit cooling ducts 506 and the main duct 508 are provided. With this configuration, the image pickup unit 200 and the main substrate 104 can be collectively cooled by intake air by the operation of the single centrifugal fan 509.

By arranging the duct coupling unit 507 avoiding the permanent magnets 217, it is possible to prevent the permanent magnets 217 and the duct coupling unit 507 from overlapping each other on the projection in the Y-axis direction. This enables downsizing of the image pickup apparatus 1 in the Y-axis direction.

Third Embodiment

Figure 14A:
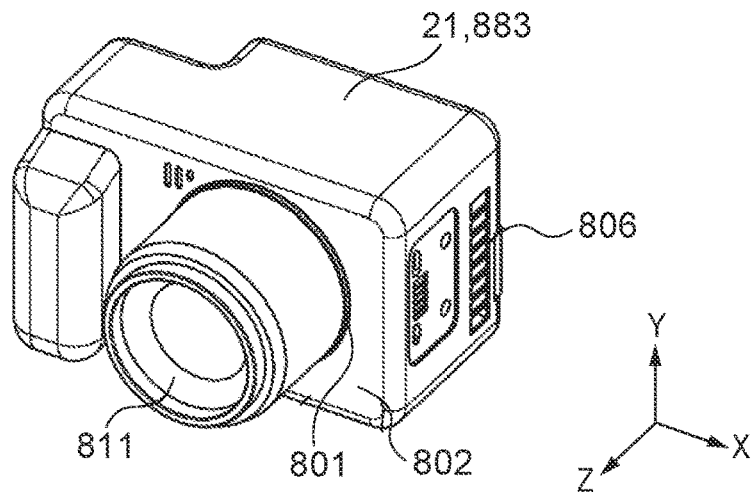
FIGS. 14A to 14C illustrate perspective views and a side view of an image pickup apparatus according to a third embodiment.
Figure 14B:
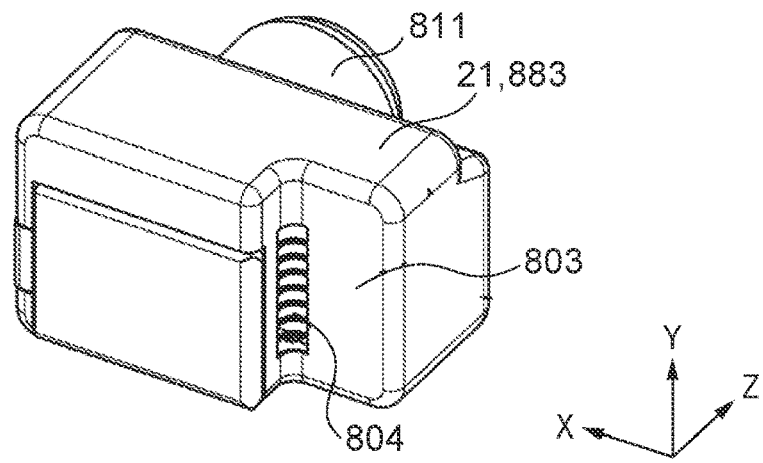
Figure 14C:
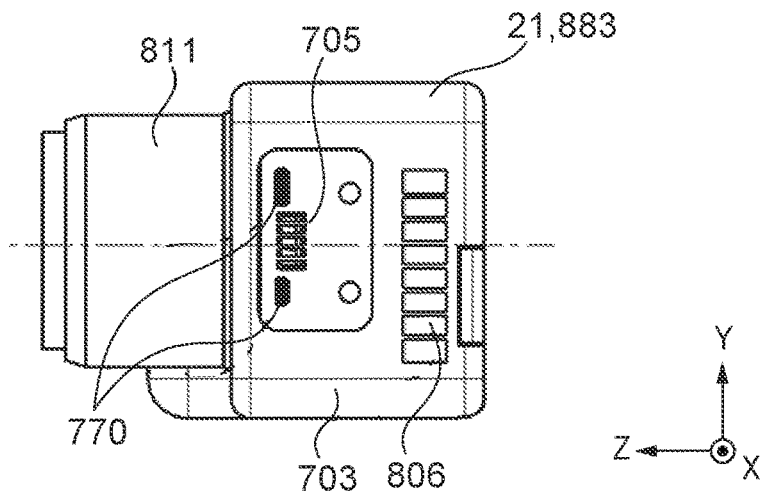

Hereinafter, a third embodiment will be described with reference to FIGS. 14A to 14C, FIGS. 15A to 15D, and FIGS. 16A and 16B. It should be noted that differences from the above-described embodiments will be mainly described, and description of similar matters will be omitted. FIGS. 14A to 14C illustrate perspective views and a side view of an image pickup apparatus according to the third embodiment.

As illustrated in the perspective view of FIG. 14A, a mount 801 to which an interchangeable lens barrel 811 is detachably attachable is disposed on a front surface 802 of an image pickup apparatus body 883. As illustrated in the perspective view of FIG. 14B, intake ports (first intake ports) 804 are disposed on a rear surface 803 of the image pickup apparatus body 883 (housing 21). As illustrated in the side view of FIG. 14C, exhaust ports 806 are disposed on a right side surface 703 of the image pickup apparatus body 883 as viewed from the subject side. Outside air taken through the intake ports 804 passes through a duct 851, which will be described later, and is discharged from the exhaust ports 806.

The right side surface 703 is provided with intake ports (second intake ports) 705 and a plurality of input/output terminals 770. The air intake ports 705 suck outside air 704 into the image pickup unit cooling duct 701 which will be described later. The input/output terminals 770 are input/output terminals for communicating with an external device like a personal computer or a printer. The number of the input/output terminals 770 arranged is two in the present embodiment, but is not limited thereto, and may be, for example, one or three or more.

The intake ports 705 are disposed adjacent to the two input/output terminals 770, that is, between the two input/output terminals 770. This configuration prevents, for example, cables connecting the input/output terminal 770 and an external device from blocking the intake ports 705.

Figure 15A:
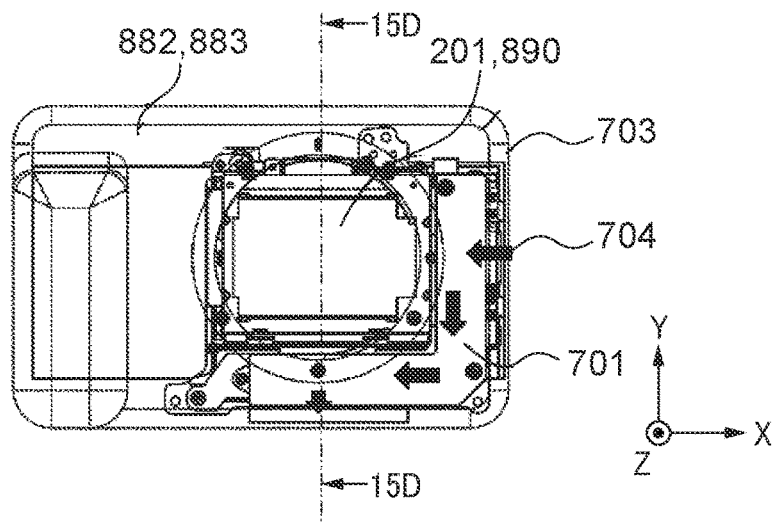
FIGS. 15A to 15D illustrate diagrams for explaining arrangement of a cooling duct for the image pickup unit and a forced air cooling path for cooling the image pickup unit.
Figure 15B:
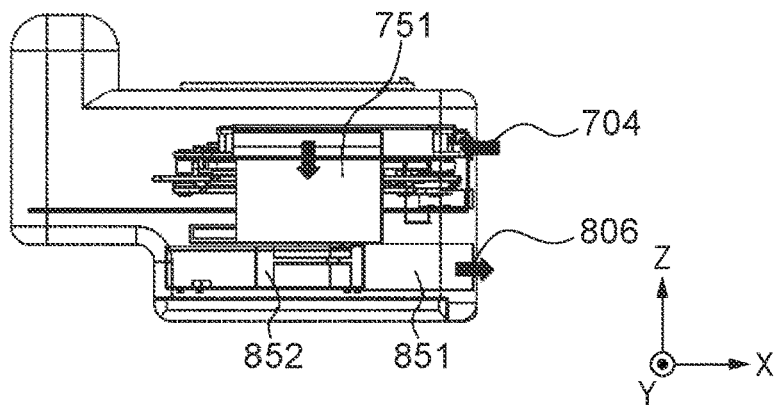
Figure 15C:
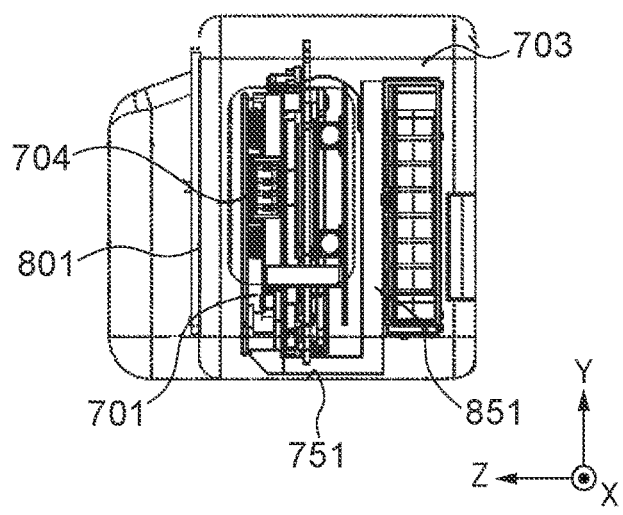
Figure 15D:
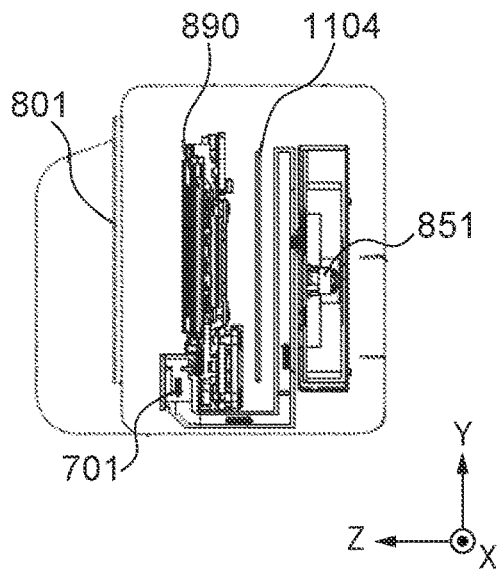
Figure 16A:
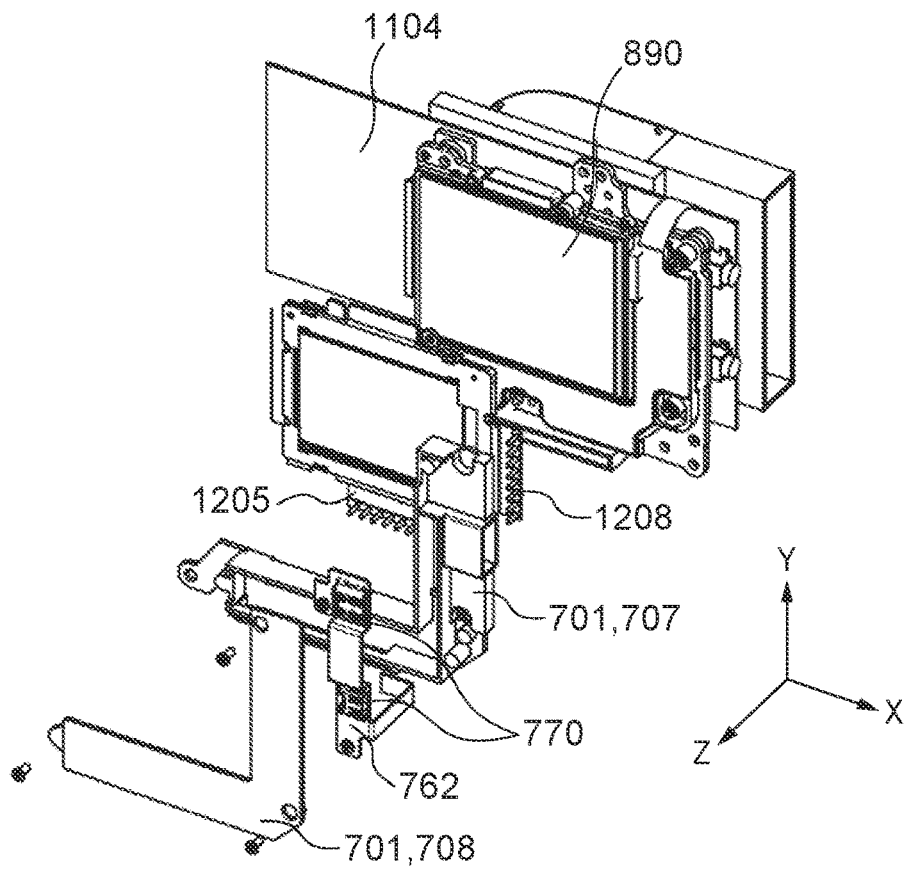
FIGS. 16A and 16B illustrate diagrams for explaining a structure of the image pickup unit cooling duct.
Figure 16B:
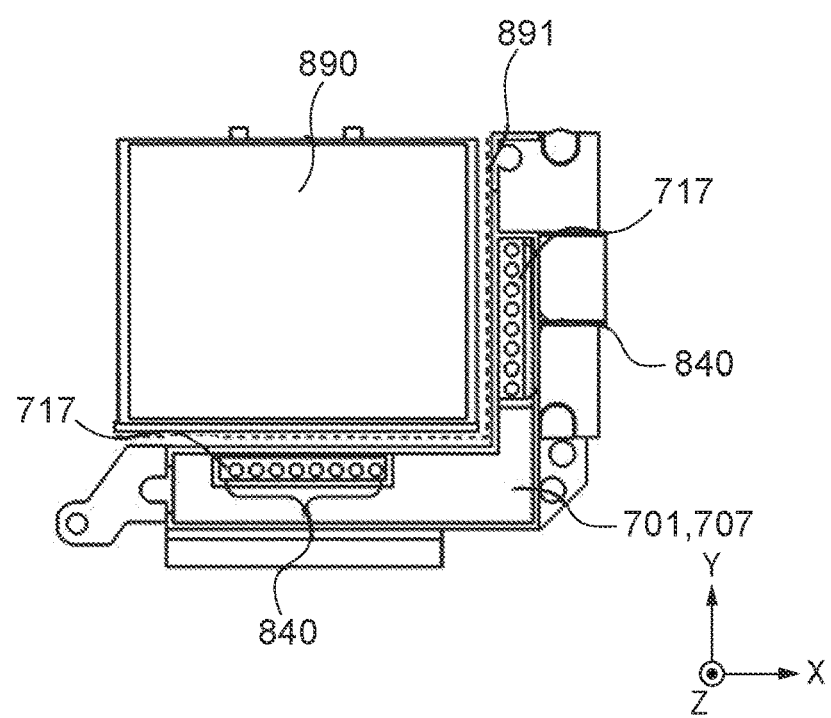

Next, the arrangement of the image pickup unit cooling duct 701 will be described. FIGS. 15A to 15D illustrate diagrams for explaining the arrangement of image pickup unit cooling duct 701 and a forced air cooling path for cooling an image pickup unit 890. FIG. 15A illustrates a front view of an image pickup apparatus 882. FIG. 15B illustrates a top view of the image pickup apparatus 882. FIG. 15C illustrates a side view of the image pickup apparatus 882. FIG. 15D is a cross-sectional view taken along the line 15D-15D in FIG. 15A. FIGS. 16A and 16B illustrate diagrams for explaining a structure of the image pickup unit cooling duct 701. FIG. 16A illustrates an exploded perspective view of the image pickup unit cooling duct 701. FIG. 16B illustrates a front view of the image pickup unit cooling duct 701.

As illustrated in FIG. 15A, the cooling structure in the present embodiment is configured to transfer heat from the image pickup unit 890 to the image pickup unit cooling duct 701, and cool the image pickup unit 890 by air (outside air) passing through the image pickup unit cooling duct 701, as in the first embodiment. As illustrated in FIG. 15C, in the image pickup apparatus body 883, the image pickup unit cooling duct 701 for cooling the image pickup unit 890 is disposed between the mount 801 and the duct 851.

As illustrated in FIG. 15A, the image pickup unit cooling duct 701 has a shape (L shape) extending along side faces 891 (see FIG. 16B) constituting a long side and a short side of the rectangular image pickup unit 890 (the image sensor 201), that is, extending along two adjacent sides of the image pickup unit 890 (the image sensor 201). With this configuration, the image pickup unit cooling duct 701 is disposed at a position that does not block light beams incident onto the image pickup unit 890.

As illustrated in FIGS. 15A and 15B, outside air 704 is supplied to the image pickup unit cooling duct 701 from the intake ports 705 provided on the right side surface 703. The image pickup unit cooling duct 701 is connected to the duct 851 via the duct coupling unit 751 below the image pickup unit 890, which is in a bottom part of the image pickup apparatus 882. With this configuration, air (outside air 704) supplied from the intake ports 705 exchanges heat with the image pickup unit 890 by the air flow generated by a centrifugal fan 852, when passing through the image pickup unit cooling duct 701. Thereafter, the air passes through the duct coupling unit 751, joins air in the duct 851, and is discharged from the exhaust ports 806.

As illustrated in FIG. 16A, the image pickup unit cooling duct 701 includes an image pickup unit cooling duct body 707 and an image pickup unit cooling duct lid member 708. A flexible cable 762 on which the input/output terminals 770 are mounted is fixed to the image pickup unit cooling duct 701. The flexible cable 762 is electrically connected to a substrate 1104 disposed on the rear of the image pickup unit 890.

As illustrated in FIG. 16B, a plurality of holes 840 are disposed in a bottom surface 717 of the image pickup unit cooling duct body 707.

Protrudes 1208 of an optical filter holding member 1205 are inserted into the respective holes 840. The protrudes 1208 reach the inside of the image pickup unit cooling duct 701. With this configuration, air passes through the image pickup unit cooling duct 701 and comes into contact with the protrudes 1208, whereby the image pickup unit 890 can be cooled.

In the present embodiment, the image pickup unit cooling duct body 707 also serves as the front holding member 210 which is one of the components of the image-stabilization mechanism. As a result, in the image pickup apparatus 882, it is possible to reduce the thickness of the image pickup apparatus body 883 in the front-rear direction by the plate thickness of the front holding member 210.

Forth Embodiment

Figure 17:
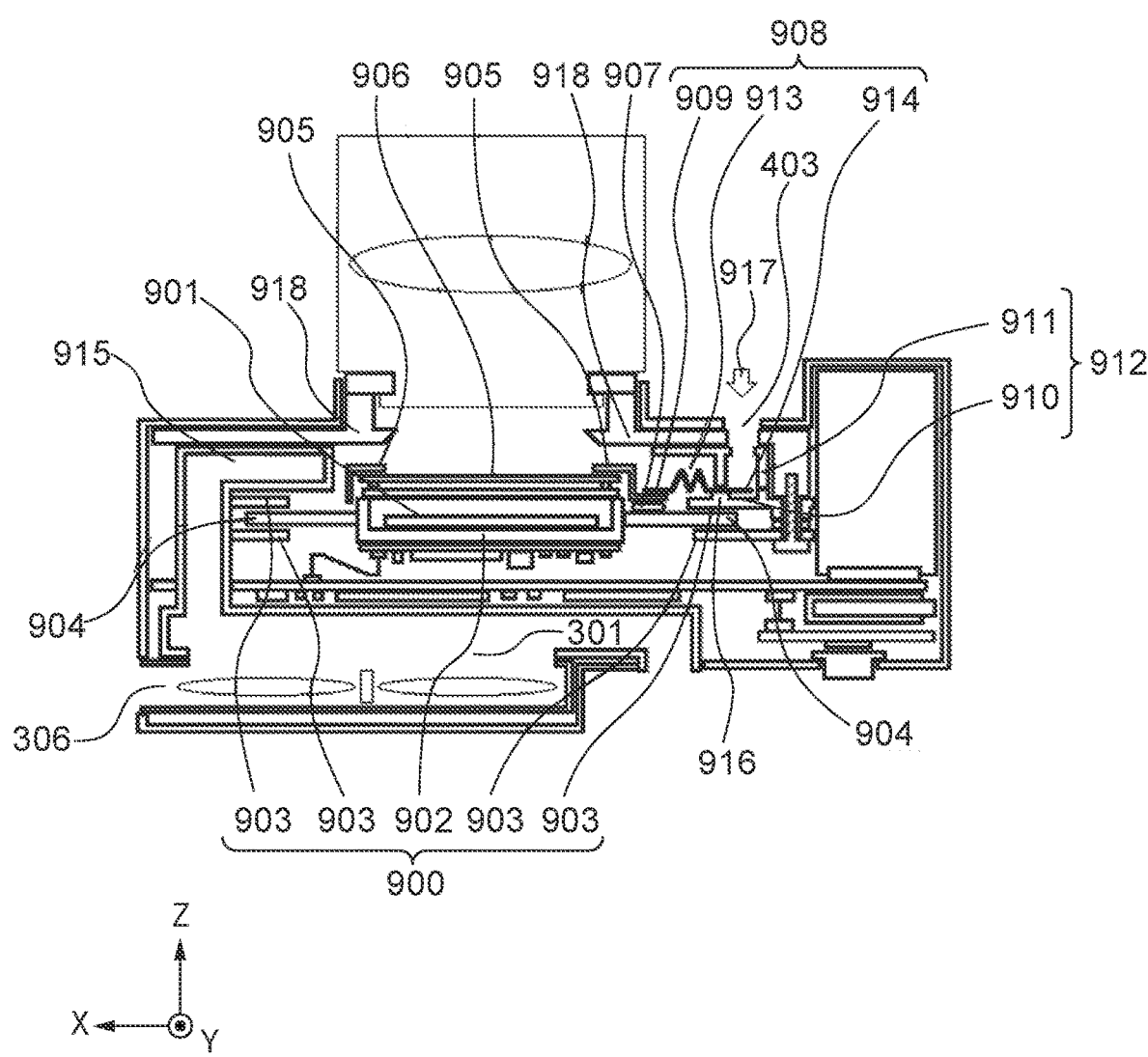
FIG. 17 illustrates a schematic configuration diagram of an image pickup apparatus according to a fourth embodiment.
Figure 18:
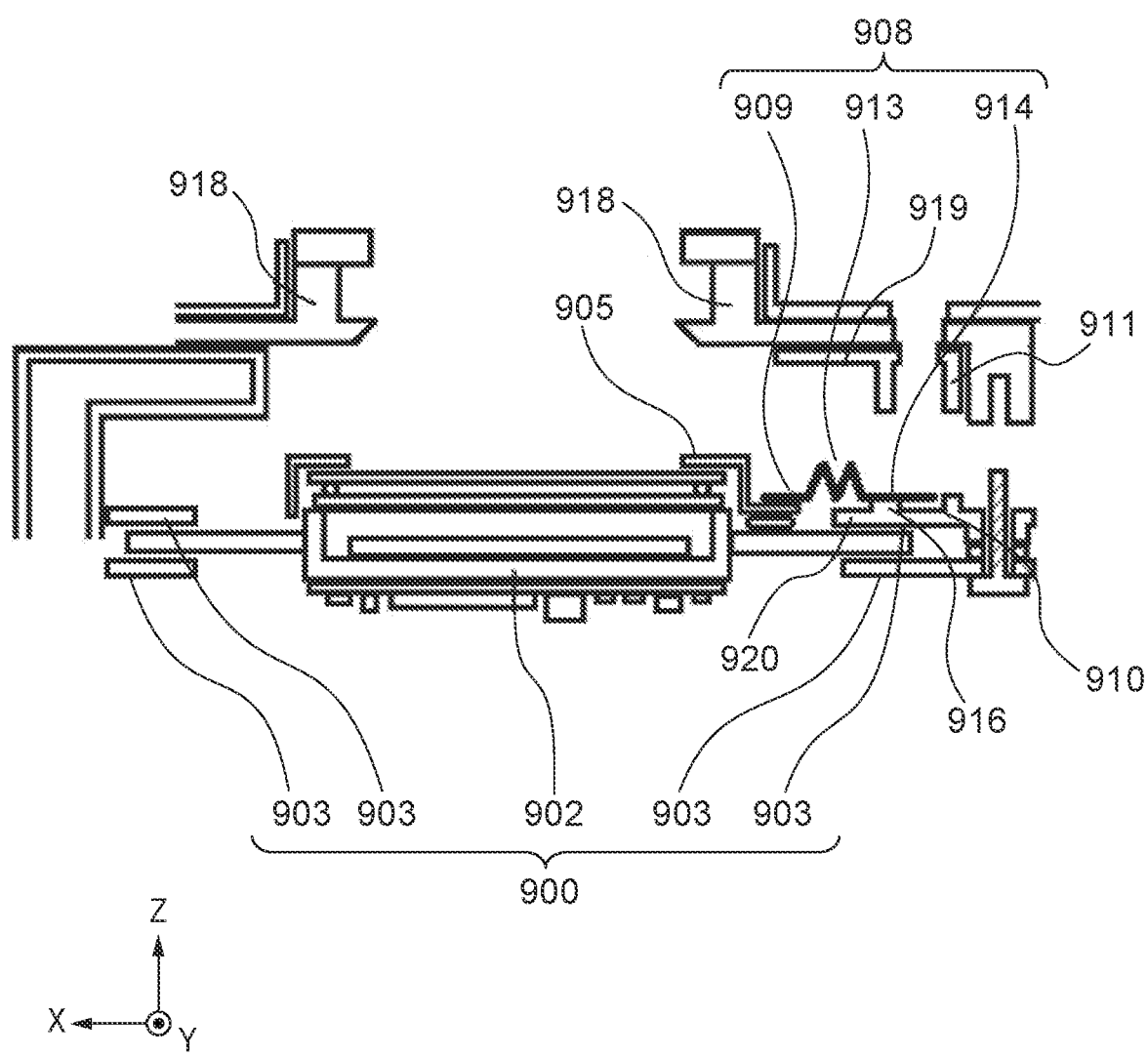
FIG. 18 illustrates an enlarged diagram of an image pickup unit and its surroundings in FIG. 17.

Hereinafter, a fourth embodiment will be described with reference to FIGS. 17 and 18. It should be noted that differences from the above-described embodiments will be mainly described, and description of similar matters will be omitted. FIG. 17 illustrates a schematic configuration diagram of the image pickup apparatus according to the fourth embodiment. FIG. 18 illustrates an enlarged diagram of the image pickup unit 900 and its surroundings in FIG. 17.

As illustrated in FIG. 17, an image pickup unit 900 includes an image pickup movable unit 902. As in the first embodiment, the image pickup movable unit 902 is supported by a position control unit 903 so as to be movable within a predetermined range along a plane orthogonal to the optical axis of an image sensor 901 (lens).

An image sensor holding member 904 is a metal member having thermal conductivity that holds the image sensor 901 and is thermally connected to the image sensor 901. An optical filter holding member 905 is fixed to the image sensor holding member 904. The optical filter holding member 905 is a metal member that holds an optical filter 906 and has thermal conductivity.

The heat generated by the image sensor 901 is transferred to the image sensor holding member 904, and further transferred to the optical filter holding member 905 via a high thermal conductivity heat-dissipation rubber 907. One end 909 of a graphite sheet 908 as a flexible heat conductive member is fixed to the optical filter holding member 905.

The image pickup unit cooling duct 911 communicates with a groove 910 provided in the position control unit 903 to form a flow path 912. Further, the graphite sheet 908 is held between the image pickup unit cooling duct 911 and the groove 910 while the other end 914 is exposed to the flow path 912 and an extra length 913 is secured in the middle in the longitudinal direction of the graphite sheet 908. The flow path 912 communicates with the image pickup unit cooling duct 915 at a position not blocking the incident light beams.

Air (outside air 917) supplied from the intake ports 403 exchanges heat with the other end 914 in the flow path 912 and passes through the image pickup unit cooling duct 915. The air joins air in the duct 301 and is discharged from the exhaust port 306. In the graphite sheet 908, the extra length 913 is secured, so that the movement of the image pickup movable unit 902 is not hindered within a predetermined range. Furthermore, the graphite sheet 908 transfers heat from the image pickup movable unit 902 to the image pickup unit cooling duct 911. Accordingly, the image pickup movable unit 902 can be cooled.

As illustrated in FIG. 18, the graphite sheet 908 is incorporated in a base member 918. In this configuration, one end 909 of the graphite sheet 908 is fixed to the optical filter holding member 905 with a thermal conductive double-sided tape, a screw, or the like. On the other hand, the other end 914 of the graphite sheet 908 is fixed to a rib 916 surrounding the groove 910. The Image pickup unit cooling duct 911 is fixed to the base member 918 in advance. The other end 914 of the graphite sheet 908 is held between the image pickup unit cooling duct 911 and the groove 910. It should be noted that the other end 914 may be temporarily fixed to the rib 916 by engagement or the like.

The extra length 913 is secured between the one end 909 and the other end 914 of the graphite sheet 908. In front of and behind the extra length 913, a wall 919 and a wall 920 are provided. This configuration achieves regulation of bending of the extra length 913.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-077640 filed on May 10, 2022 which is hereby incorporated by reference herein in its entirety.

What is claimed is:

1. An image pickup apparatus comprising:
a housing in a front part of which a lens barrel containing a lens is disposed;
an image pickup unit including an image sensor that picks up an optical image formed by the lens, the image pickup unit being disposed in an inner space of the housing to divide the inner space into a first space and a second space, the second space being in front of the first space;
an electronic component in the first space, communicably connected to the image sensor;
a first duct in the first space, including a first heat exchanger that exchanges heat with the electronic component, and a first flow path through which air for cooling the electronic component via the first heat exchanger passes; and
a second duct in the second space, including a second heat exchanger that exchanges heat with the image pickup unit, and a second flow path through which air for cooling the image pickup unit via the second heat exchanger passes,
wherein the image pickup unit includes an optical filter disposed in front of the image sensor, and an optical filter holding member that holds the optical filter and has thermal conductivity,
the second duct has a through hole communicating with the second flow path and into which a part of the optical filter holding member is inserted, and
the second heat exchanger is made of a filler with viscoelasticity, filling the through hole.

2. The image pickup apparatus according to claim 1,
wherein the image pickup unit and the electronic component are disposed between the first duct and the second duct.

3. The image pickup apparatus according to claim 1, further comprising a drive mechanism disposed between the first duct and the second duct to drive the image pickup unit in a direction orthogonal to an optical axis of the image sensor.

4. The image pickup apparatus according to claim 1,
wherein the second duct is disposed at a position not overlapping with the image sensor as viewed from an optical axis direction of the image sensor.

5. The image pickup apparatus according to claim 4,
wherein the second duct runs on both sides of the image sensor.

6. The image pickup apparatus according to claim 1, further comprising a coupling duct that couples the first duct and the second duct.

7. The image pickup apparatus according to claim 6,
wherein the coupling duct extends along an optical axis direction of the image sensor.

8. The image pickup apparatus according to claim 6,
wherein the coupling duct is disposed at a position not overlapping with the image sensor as viewed from an optical axis direction of the image sensor.

9. The image pickup apparatus according to claim 6, further comprising a drive mechanism that drives the image pickup unit in a direction orthogonal to an optical axis of the image sensor,
wherein the coupling duct is disposed at a position not overlapping with the drive mechanism as viewed from a bottom side of the housing.

10. The image pickup apparatus according to claim 6, further comprising a fan disposed in the first duct to force air to pass through the first duct.

11. The image pickup apparatus according to claim 1,
wherein the first flow path includes a first intake port that is an opening in the housing and through which air is sucked, and the second flow path includes a second intake port that is an opening in the housing at a different position than the first intake port and through which air is sucked.

12. The image pickup apparatus according to claim 11, wherein the first intake port is disposed in a rear part of the housing, and the second intake port is disposed in the front part of the housing.

13. The image pickup apparatus according to claim 1, wherein the first flow path includes an exhaust port that is an opening in the housing, is shared with the second flow path and through which air is discharged, and air passing through the first flow path and air passing through the second flow path are discharged from the exhaust port.

14. The image pickup apparatus according to claim 1, wherein the first heat exchanger is in contact with the electronic component and is formed of a member having elasticity and thermal conductivity.

15. The image pickup apparatus according to claim 1, wherein the image pickup unit includes a device holding member that holds the image sensor and has thermal conductivity, and a member that is in contact with the device holding member and the optical filter holding member and has elasticity and thermal conductivity.

16. The image pickup apparatus according to claim 1, wherein the electronic component is a control board that controls the image sensor.

* * * * *